(12) United States Patent
Howman et al.

(10) Patent No.: US 7,340,835 B2
(45) Date of Patent: Mar. 11, 2008

(54) HOT DOG SLICER

(75) Inventors: Shelly S. Howman, Roswell, GA (US); Karen L. O'Kelley, Woodstock, GA (US); Giorgos Hatzilias, Lawrenceville, GA (US)

(73) Assignee: Katie Lane Corp., Atlanta, GA (US)

( * ) Notice: Subject to any disclaimer, the term of this patent is extended or adjusted under 35 U.S.C. 154(b) by 66 days.

(21) Appl. No.: 11/328,304

(22) Filed: Jan. 9, 2006

(65) Prior Publication Data

US 2006/0107531 A1    May 25, 2006

Related U.S. Application Data

(63) Continuation-in-part of application No. 09/999,107, filed on Oct. 31, 2001, now Pat. No. 7,065,880.

(51) Int. Cl.
*A21C 15/04* (2006.01)

(52) U.S. Cl. .................... 30/114; 30/279.2; 30/282; 83/932

(58) Field of Classification Search ............... 30/114, 30/124, 303, 278, 299, 300, 279.2, 282; 83/167, 83/932, 44, 408; 99/537
See application file for complete search history.

(56) References Cited

U.S. PATENT DOCUMENTS

| 590,129 | A | * | 9/1897 | Bullette ................ 76/101.1 |
|---|---|---|---|---|
| 874,133 | A | * | 12/1907 | Steven ................ 83/435.18 |
| 2,852,053 | A | * | 9/1958 | Berry et al. ............ 83/435.15 |
| 3,057,386 | A | * | 10/1962 | Massaro ................ 83/356.1 |
| 3,112,781 | A | * | 12/1963 | Popeil ................ 83/435.15 |
| 3,561,511 | A | * | 2/1971 | Kummer ................ 83/597 |
| 3,800,649 | A | * | 4/1974 | Chinn ................ 83/651.1 |
| 4,557,053 | A | * | 12/1985 | Hadley, Jr. ................ 30/279.2 |
| 4,599,928 | A | * | 7/1986 | Oker ................ 83/581.1 |
| 4,646,602 | A | * | 3/1987 | Bleick ................ 83/408 |
| 5,069,914 | A |  | 12/1991 | Gagliardi, Jr. |
| 5,662,033 | A | * | 9/1997 | Yawman ................ 99/538 |

* cited by examiner

*Primary Examiner*—Kenneth E. Peterson
*Assistant Examiner*—Phong Nguyen
(74) *Attorney, Agent, or Firm*—Gardner Groff Greenwald & Villanueva, PC

(57) ABSTRACT

A housing with at least one elongate chamber for a hot dog, a series of transverse blades for slicing the hot dog laterally into a number of disc sections, and at least one longitudinal blade for slicing the hot dog lengthwise, for example into quarters. The housing includes two parts that rotate or otherwise move relative to each other to make the transverse slices. Preferably, the first part of the housing includes a hopper with a retainer surface and the second part of the housing includes a series of transverse blades that rotate to transversely slice the hot dog. Furthermore, the two parts preferably include alignable openings permitting the transversely sliced hot dog to fall into the chamber for longitudinal slicing. Preferably, a plunger pushes the hot dog into the longitudinal blade to slice the hot dog lengthwise.

20 Claims, 15 Drawing Sheets

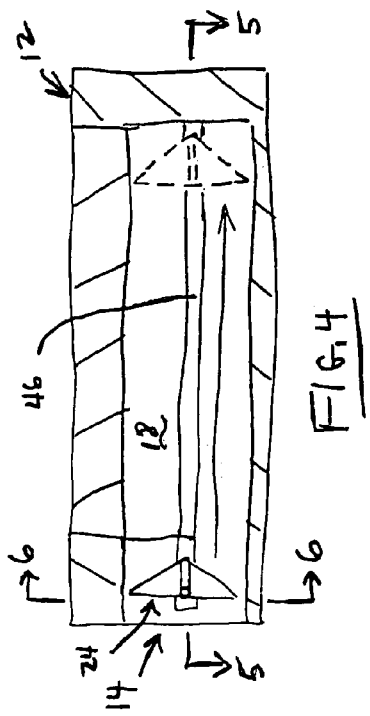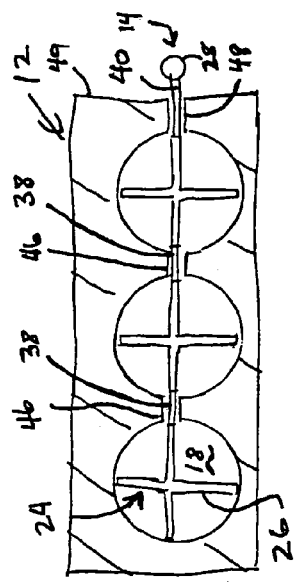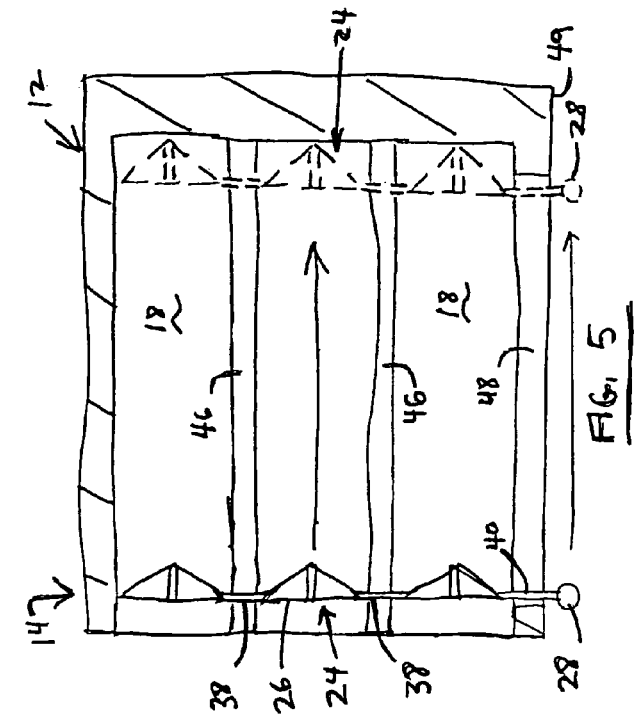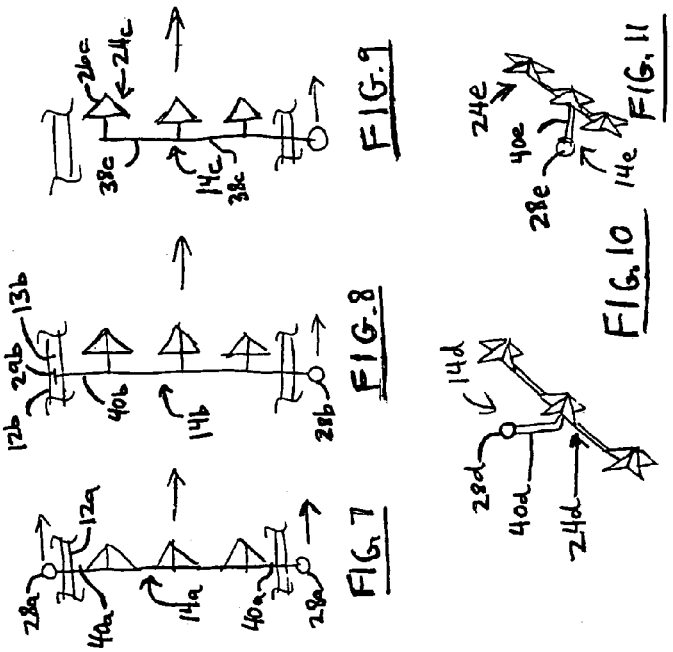

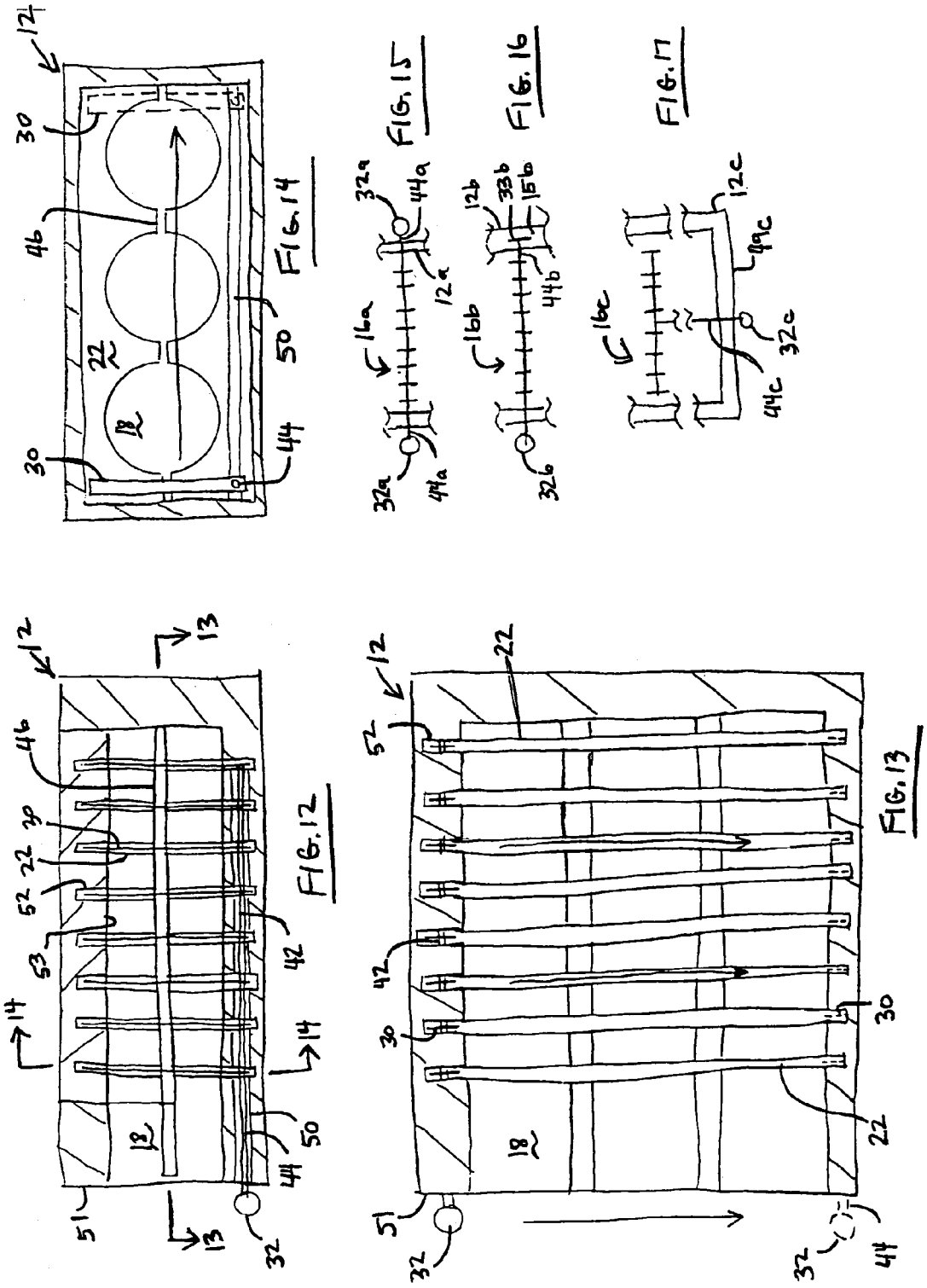

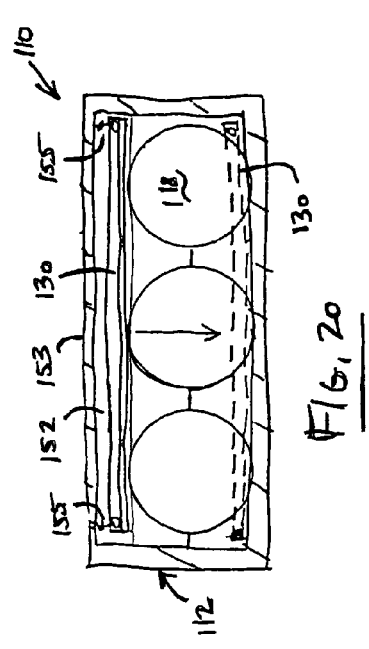
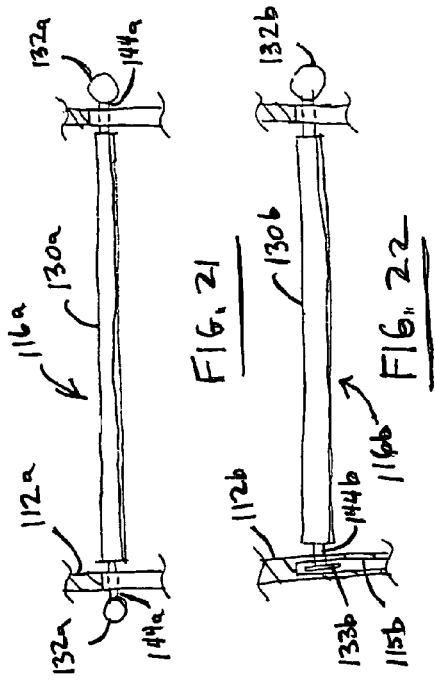
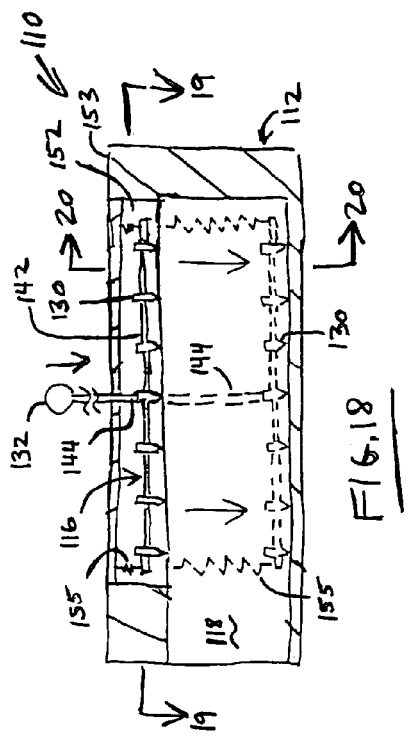
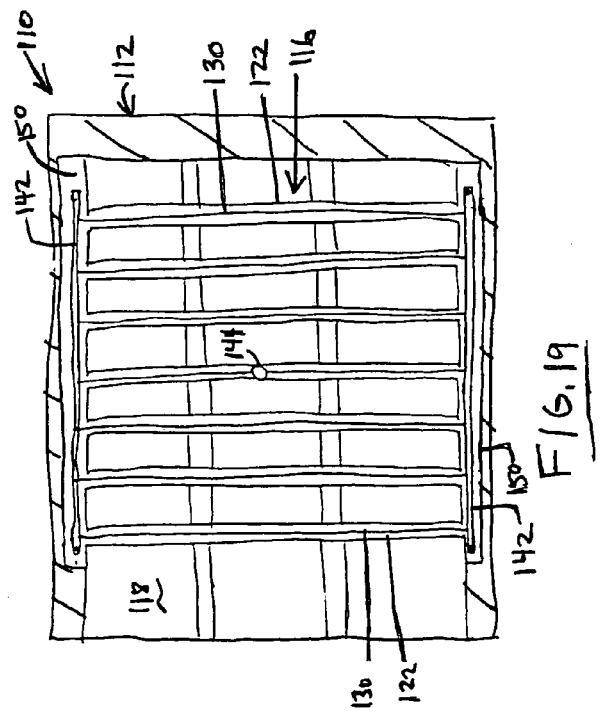

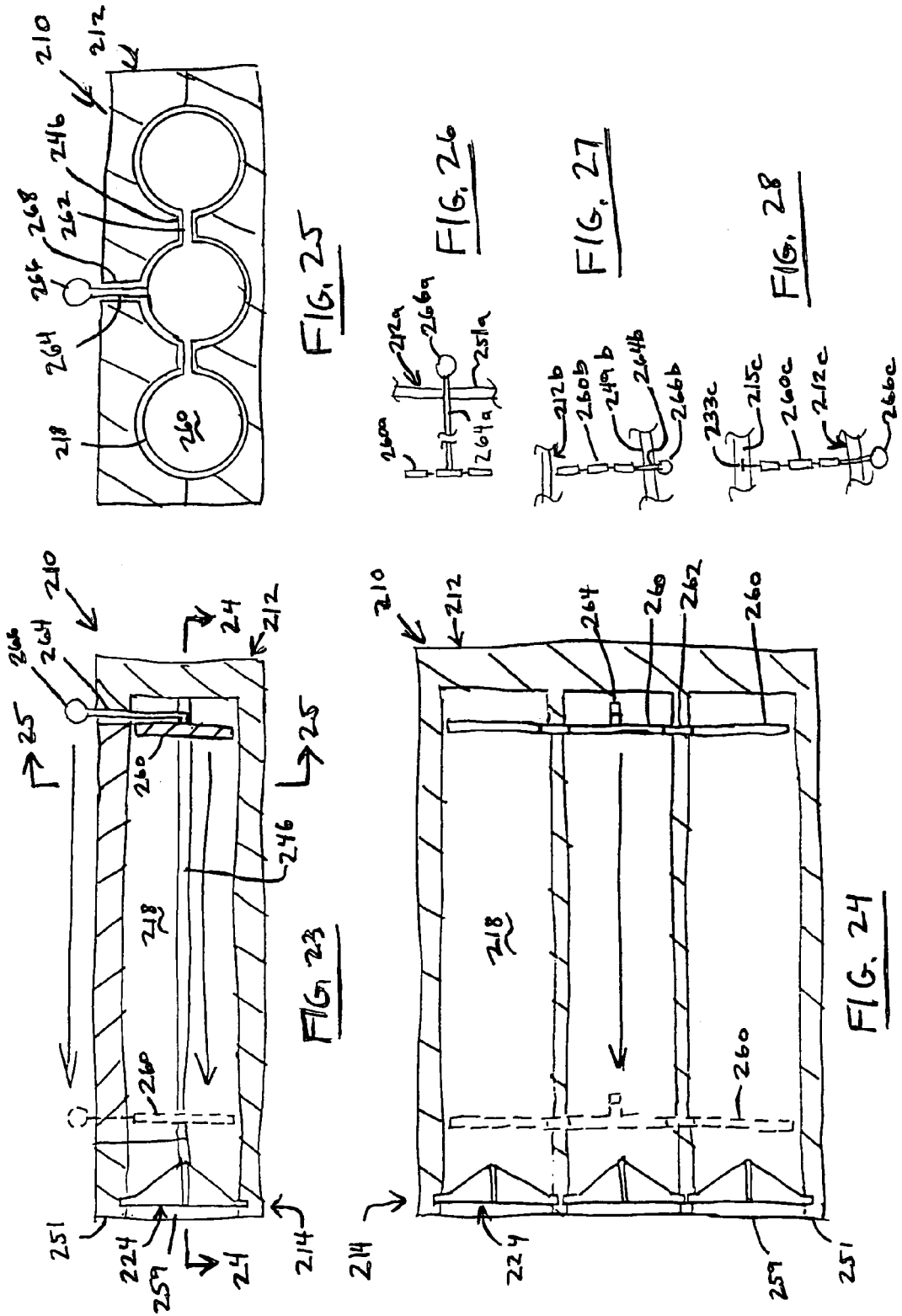

HOT DOG SLICER

CROSS-REFERENCE TO RELATED APPLICATION

This application is a Continuation-In-Part of U.S. patent application Ser. No. 09/999,107 on Oct. 31, 2001 now U.S. Pat. No. 7,065,880 entitled HOT DOG SLICER, the entire scope and content of which is hereby incorporated herein by reference.

TECHNICAL FIELD

This invention relates to food slicing devices and, more particularly, to a slicer with blades for cutting hot dogs into small enough pieces that children do not choke on them.

BACKGROUND OF THE INVENTION

Children have a smaller diameter esophagus than adults, and consequently they choke on their food more often. In particular, hotdogs are the leading choking hazard for children in the United States. Thus, children choke more often on hot dogs than on candy, coins, buttons, marbles, balls, small pieces of action figures or other toys, meat, or any other item. Furthermore, children have died from choking on hot dogs (see *The Miami Herald*, Miami, Fla., Jan. 7 and 14, 2000). And while most of the time the obstruction is cleared and the child does not die, choking nevertheless is a frightening experience for kids. Choking is especially dangerous at schools and other places with a high child-to-adult ratio because children are generally not as informed and able to recognize that another person is choking and to physically dislodge the obstruction. Because of the risk of choking deaths, many American schools no longer even serve hot dogs, a quintessential American food.

To prevent choking, a child's food should be cut into small pieces. Many kids do not chew their food enough, particularly pieces of meat, so it's best to cut their food into pieces small enough to pass through their esophagus. Because most hot dogs have a diameter that is larger than the diameter of most kid's esophagus, slicing the hot dog into disc-shaped sections of the same diameter does not necessarily eliminate the choking hazard. Many pediatricians therefore recommend that hot dogs be quartered lengthwise in addition to being sliced laterally into discs, so that the resulting pieces are small enough to easily slide down a child's throat. These smaller pieces are therefore much less likely to cause choking in children, as well as elderly persons, pets, or other persons with small throats.

Using a knife to manually cut hot dogs into such small pieces is a rather difficult and tedious task. For schools, camps, day care facilities, and so forth that serve large numbers of kids, such manual slicing is too labor-intensive and time-consuming to be practical. There are several known devices for cutting hot dogs, however, none of them provide for cutting hot dogs into pieces small enough to prevent children from choking. Most of these devices merely provide for cutting slits in the hot dog prior to cooking, and do not provide for cutting all the way through the dog.

Accordingly, what is needed but not found in the prior art is a slicer for cutting hot dogs into pieces that are small enough that children do not choke on them, and that is safe and easy to manufacture and use. There is further a need for such a slicer that that can slice multiple hot dogs simultaneously for serving a larger number of children at once, as well as for such a slicer that only slices one hot dog at a time for serving a smaller number of children at once. It is to the provision of such hot dog slicers that the present invention is primarily directed.

SUMMARY OF THE INVENTION

The present invention provides an innovative slicer for cutting hot dogs or similar elongated food products. Generally described, the slicer has a housing, a longitudinal blade assembly, and a transverse blade assembly. The housing has one or more elongate chambers for the hot dogs, the longitudinal blade assembly has one or more blade sets positioned within the chambers for making lengthwise slices, and the transverse blade assembly has transverse blades connected to each other for simultaneously making lateral slices. In embodiments having a multi-chambered housing for simultaneously slicing multiple hot dogs, the longitudinal blade sets are connected to each other so that they slide simultaneously to slice the hot dogs lengthwise, and the transverse blades are lengthened accordingly.

The number of chambers and the number and position of blades (longitudinal and transverse) can be selected to provide the slicing desired for a given application. For example, the slicer can have eight chambers for slicing eight hot dogs at once for use at schools, camps, day care facilities, hospitals, and other places where many children are served at once. On the other hand, the slicer can be provided with a smaller number of chambers (such as one, two, or three) for home use. Alternatively, the slicer can be provided with two rows of chambers, for example, a first row of four chambers and beside that in the housing a second row of four chambers. Also, the size and shape of the chambers can be selected for slicing other food products such as sausages, cucumbers, pickles, carrots, celery, cheese, and so forth.

In a first preferred embodiment of the invention, each of the blade sets of the longitudinal blade assembly has four blade sections that are arranged radially in the shape of an "X" for slicing the hot dogs into quarters. The blade sets are connected to each other by connecting arms that slide through connecting slots between the chambers inside the housing. A handle is connected to a control arm that is connected to the blade sets and that slides through a control slot in the outside wall of the housing. Thus, by sliding the handle, the blade sets slide through the length of the chambers to slice the hot dogs into quarters. In alternative forms, the handle can extend though the top, end, or side of the housing, multiple handles can be provided, and/or a guide member and slot can be provided for the blade sets.

Also, the blades of the transverse blade assembly are connected to each other by connecting arms, and a handle is connected to a control arm that is connected to the transverse blades. The connecting arms and the control arm slide through a control slot inside the housing that extends through the outside wall of the housing. Thus, by sliding this handle, the transverse blades slide through the guide channels and therefore through the width of the chambers to slice the hot dogs into quarters. In alternative forms, the handle can extend though the top, end, or side of the housing, multiple handles can be provided, and/or a guide member and slot can be provided for the blade sets.

Additionally, the housing is made of a base and a hinged lid each having an interior surface with recessed portions. When the lid is closed, the recessed portions combine to form the chambers. To use the slicer, the lid is opened, hot dogs are placed in the chambers, the lid is closed, and the longitudinal and transverse blade assemblies are operated to slice the hot dogs in the chambers.

In a second exemplary embodiment, the slicer has a transverse blade assembly mounted in the lid of the housing. In this configuration, the blades are forced downward through the hot dogs and retracted back upward into the lid after slicing, instead of being slid sideways across the chambers. In alternative forms, multiple handles can be provided and/or a guide member and slot can be provided for the blades.

In a third exemplary embodiment, the slicer has longitudinal blade sets that are fixed at an end of the chambers, and also includes a paddle assembly having a paddle in each chamber. The paddles are connected together by connecting arms that slide in the connecting slots, and a handle is connected to the paddles by a control arm that slides in a control slot though the sidewall of the housing. To use the slicer, the handle is moved causing the paddles to slide along the length of the elongate chambers which forces the hot dogs in the chambers across the fixed blade sets, thereby slicing the hot dogs into small pieces, and out the end of the chamber. In alternative forms, the handle can extend though the top, end, or side of the housing, multiple handles can be provided, and/or a guide member and slot can be provided for the blade sets.

In a fourth exemplary embodiment, the slicer housing has a base and an insert tray that slides out of the base to load hot dogs and slides back into the base to slice them. In a fifth exemplary embodiment, the slicer housing has only one hot dog chamber, as may be desired for home use. In a sixth exemplary embodiment, the slicer housing has a base and a hinged lid at one of the ends of the base so that the hot dogs can be slid into the chambers through the end of the base and then the lid can be closed before slicing the hot dogs. Other housing configurations can be provided, as may be desired in a particular application.

In addition, the present invention provides a slicer that has a housing including two parts that rotate or otherwise move relative to each other to make the transverse slices. In a seventh exemplary embodiment, for example, the first part of the housing includes a hopper with a retainer wall surface and the second part of the housing includes a series of transverse blades extending into the hopper so that when the two parts are rotated relative to each other the hot dog is transversely sliced between the transverse blades and the retainer surface. Preferably, the two parts include alignable openings that permit the hot dog, after it has been transversely sliced, to fall from the hopper into a chamber of the housing for longitudinal slicing, and one of the parts has a blocking section that prevents the hot dog from falling into the chamber during the transverse slicing. In addition, for performing the longitudinal slicing, the slicer preferably includes a plunger and a longitudinal blade arrangement in the housing chamber, similar to the paddle and longitudinal blade arrangement of the third exemplary embodiment.

In view of the foregoing, it will be appreciated that the hot dog slicers of the present invention can be used to safely and easily cut hot dogs into pieces small enough that children do not choke on them. In particular, the slicers can be operated to cut hot dogs lengthwise, for example, into quarters, and to also slice dogs laterally into a number of disc sections, ensuring that the resulting pieces are smaller than children's throats.

The specific techniques and structures employed by the invention to improve over the drawbacks of the prior devices and accomplish the advantages described above will become apparent from the following detailed description of the embodiments of the invention and the appended drawings and claims.

BRIEF DESCRIPTION OF THE DRAWINGS

FIG. 4 is a longitudinal section view of the hot dog slicer of FIG. 1, showing the operation of the longitudinal blade assembly.

FIG. 5 is a section view of the hot dog slicer taken at line 5-5 of FIG. 4.

FIG. 6 is a section view of the hot dog slicer taken at line 6-6 of FIG. 4.

FIG. 7 is a plan view of a first alternative longitudinal blade assembly of the hot dog slicer of FIG. 1.

FIG. 8 is a plan view of a second alternative longitudinal blade assembly of the hot dog slicer of FIG. 1.

FIG. 9 is a plan view of a third alternative longitudinal blade assembly of the hot dog slicer of FIG. 1.

FIG. 10 is a perspective view of a fourth alternative longitudinal blade assembly of the hot dog slicer of FIG. 1.

FIG. 11 is a perspective view of a fifth alternative longitudinal blade assembly of the hot dog slicer of FIG. 1.

FIG. 12 is a longitudinal section view of the hot dog slicer of FIG. 1, showing the operation of the transverse blade assembly.

FIG. 13 is a section view of the hot dog slicer taken at line 13-13 of FIG. 12.

FIG. 14 is a section view of the hot dog slicer taken at line 14-14 of FIG. 12.

FIG. 15 is a plan view of a first alternative transverse blade assembly of the hot dog slicer of FIG. 1.

FIG. 16 is a plan view of a second alternative transverse blade assembly of the hot dog slicer of FIG. 1.

FIG. 17 is a plan view of a third alternative transverse blade assembly of the hot dog slicer of FIG. 1.

FIG. 18 is a longitudinal section view of a second exemplary embodiment of the present invention, showing a hot dog slicer with a top-mounted transverse blade assembly.

FIG. 19 is a section view of the hot dog slicer taken at line 19-19 of FIG. 18.

FIG. 20 is a section view of the hot dog slicer taken at line 20-20 of FIG. 18.

FIG. 21 is an elevation detail view of a first alternative transverse blade assembly of the hot dog slicer of FIG. 18.

FIG. 22 is an elevation detail view of a second alternative transverse blade assembly of the hot dog slicer of FIG. 18.

FIG. 23 is a longitudinal section view of a third exemplary embodiment of the present invention, showing a hot dog slicer with a fixed transverse blade assembly and a movable paddle assembly.

FIG. 24 is a section view of the hot dog slicer taken at line 24-24 of FIG. 23.

FIG. 25 is a section view of the hot dog slicer taken at line 25-25 of FIG. 23.

FIG. 26 is an elevation detail view of a first alternative paddle assembly of the hot dog slicer of FIG. 23.

FIG. 27 is an elevation detail view of a second alternative paddle assembly of the hot dog slicer of FIG. 23.

FIG. 28 is an elevation detail view of a second alternative paddle assembly of the hot dog slicer of FIG. 23.

DETAILED DESCRIPTION OF THE EXEMPLARY EMBODIMENTS

Figure 1:
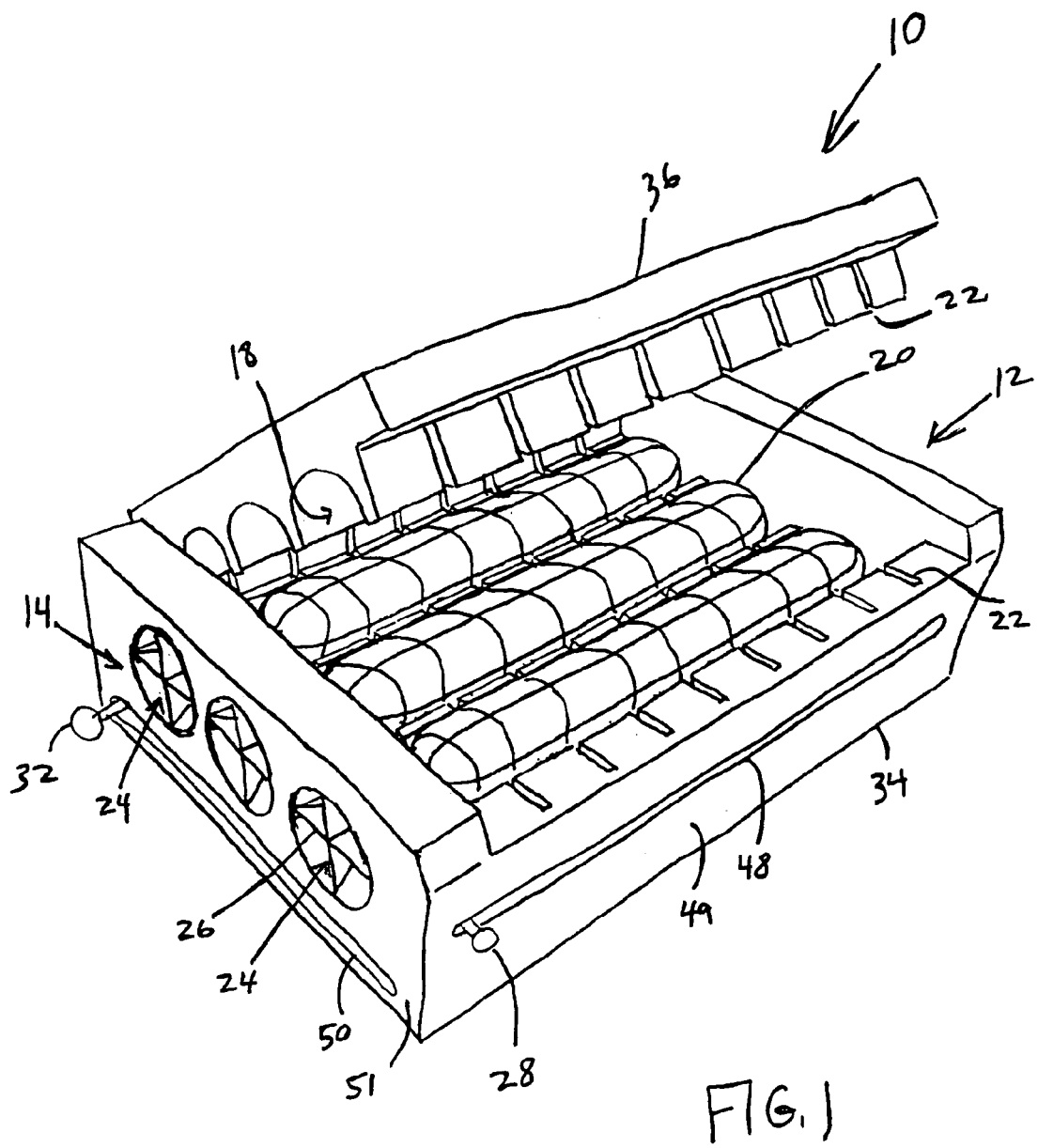
FIG. 1 is a perspective view of a first exemplary embodiment of the present invention, showing a hot dog slicer holding hot dogs that have been sliced longitudinally and transversely by the slicer.
Figure 2:
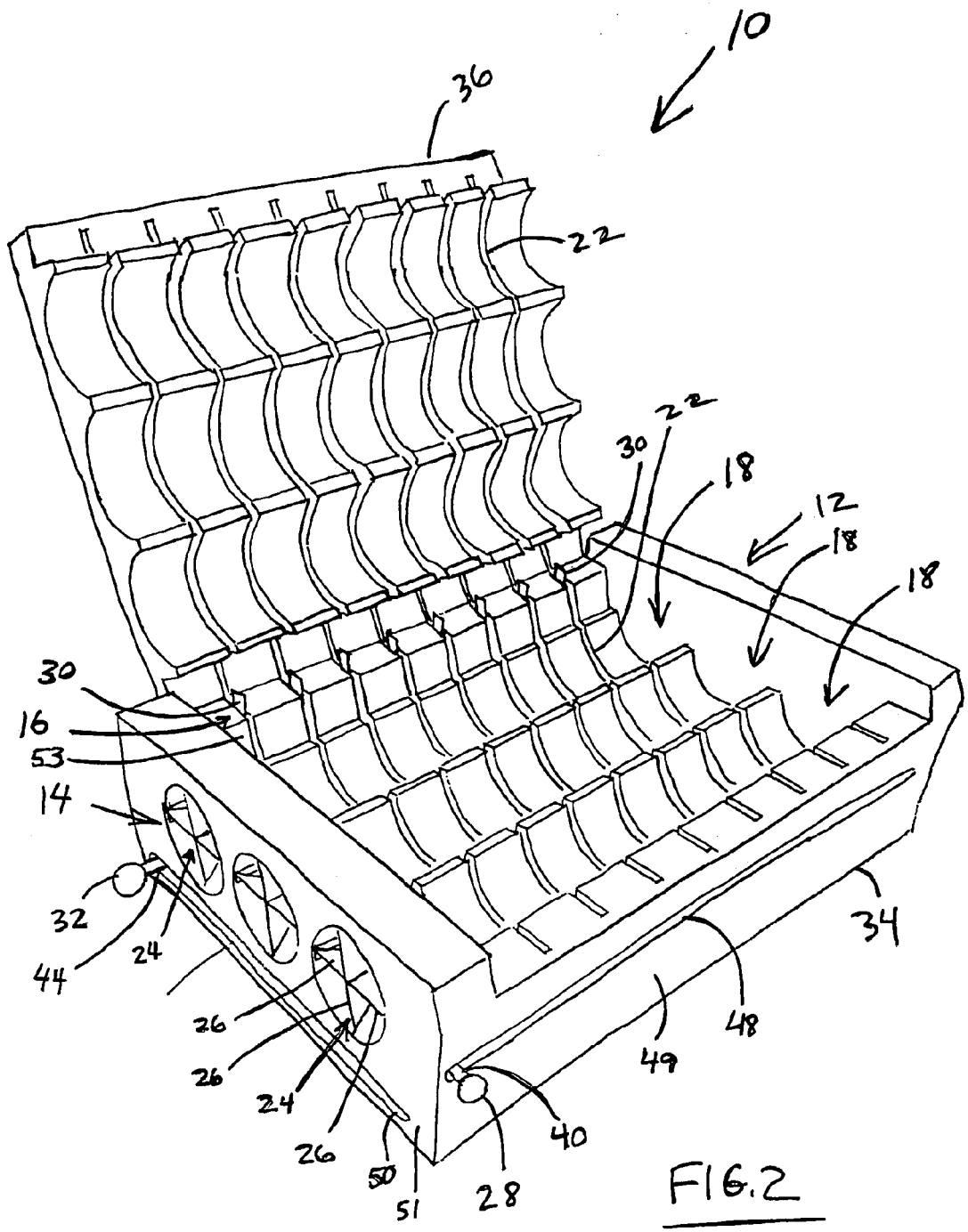
FIG. 2 is a perspective view of the hot dog slicer of FIG. 1, showing the interior surfaces and components of the slicer.

Referring now to FIGS. 1 and 2, there is illustrated a first exemplary embodiment of the present invention, referred to generally as the slicer 10. The slicer 10 has a housing 12, a longitudinal blade assembly 14, and a transverse blade assembly 16. The housing 12 has elongate chambers 18 for hot dogs 20 (shown already sliced into small pieces) and a series of spaced apart transverse guide channels 22. The longitudinal blade assembly 14 has blade sets 24 of four blade sections 26 and a handle 28 operatively connected to the blade sets 24 so that moving the handle 28 moves the blade sets 24 from a first to a second position to slice the hot dogs 20 longitudinally into quarters. The transverse blade assembly 16 has a series of transverse blades 30 that are received in the guide channels 22 and a handle 32 operatively connected to the blades 30 so that moving the handle 32 moves the blades 30 from a first to a second position to slice the hot dogs 20 transversely into pieces.

In this way, the longitudinal blade assembly 14 and the transverse blade assembly 16 permit a user to slice hot dogs 20 both lengthwise into quarters (longitudinally) and sideways through their width (transversely) to end up with small pieces of hot dog that can be safely eaten by children without choking. The longitudinal blade assembly 14 can be operated before the transverse blade assembly 16 or vice versa, or only one of the blade assemblies can be operated if that is all that is desired. Additionally, because the housing 12 has multiple chambers 18 and the longitudinal handle 28 is provided for operating the longitudinal blade sets 24 of each chamber, multiple hot dogs 20 can be quickly and easily sliced at the same time in one operation, so that large numbers of hot dogs can be prepared for serving large numbers of kids in schools, camps, day care, etc. Furthermore, because the longitudinal blades 26 and the transverse blades 30 are recessed within the housing 12, they do not a present safety hazard when putting hot dogs into the chambers or taking the sliced hot dogs out, so the slicer 10 is safe to use.

The slicer 10 can be adapted for use in many different applications. For example, for use in commercial applications, the slicer can have a large number of elongate chambers, a large number of longitudinal blade sets, and longer transverse blades. Such applications would include schools, camps, day care facilities, restaurants, and so forth, where slicers with, for example, eight chambers and blade sets might be provided. The slicer 10 of the embodiment shown has three chambers 18 and blade sets 24, as might be suitable for residential use. Of course, the slicer can be provided with any number of chambers and blade sets as may be desired for a given application.

Also, the slicer 10 is shown with curved chamber walls that form tubular chambers with a length and diameter selected for receiving the hot dogs to be sliced. Alternatively, the tubular chambers can be provided with other lengths and diameters selected for use with other generally tubular food products such as sausages, pickles, cucumbers, zucchini, and so forth. Additionally, the slicer can be used for slicing or dicing celery or carrots, or for cutting up onions, peppers, potatoes, apples, and other food products that have been cut into small enough pieces to fit into one of the chambers. In other forms of the present invention, the slicer has squared chambers for cutting cheese and other items. Of course, the slicer can be provided with chambers having any regular or irregular shape that may be desired for slicing a particular food product. Furthermore, depending on the food product and the desired cutting of it, the slicer can be provided with only one of the blade assemblies, either the longitudinal blade assembly or the transverse blade assembly.

Additionally, the housing 12 can be provided in a variety of different configurations. The housing 12 shown has a base 34 and a lid 36 hingedly coupled to the base, with the base and the lid having interior facing walls that are recessed to cooperatively form the chambers 18 when the lid is swung closed. The housing 12 can be made from a plastic, metal, composite, or other material. It will be understood that the housing can be provided in many other forms, several of which are described below as exemplary embodiments four through six.

Figure 3:
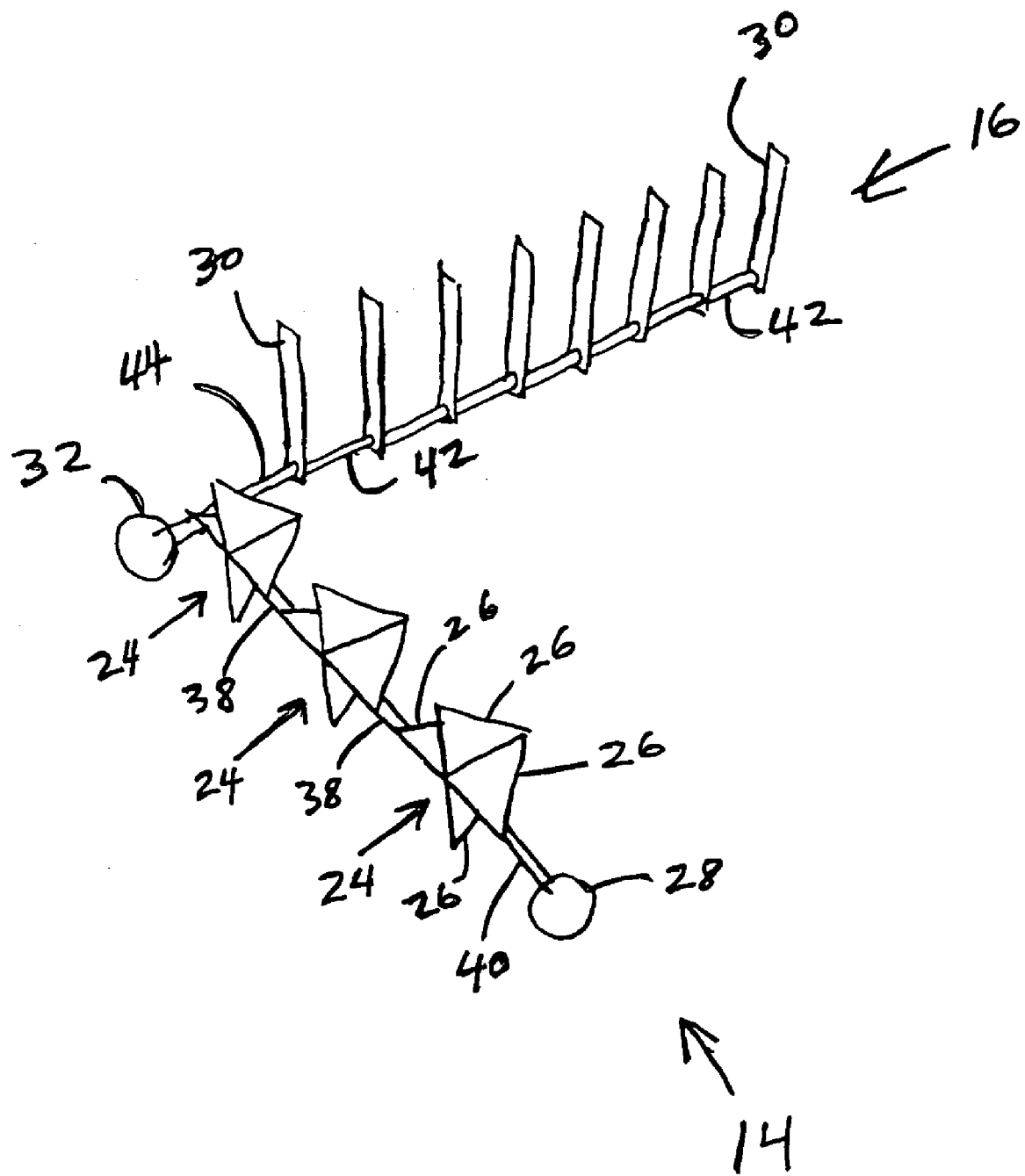
FIG. 3 is a perspective view of a longitudinal blade assembly and a transverse blade assembly of the hot dog slicer of FIG. 1.

Referring now to FIG. 3, the longitudinal blade assembly 14 has one of the blade sets 24 for each chamber 18, so the three-chamber housing 12 shown has three blade sets 24. Each blade set has four blade sections 26 that are radially arranged in the shape of an "X" for slicing one of the hot dogs into quarters. Alternatively, other numbers and configurations of blade sections can be provided depending on the number and position of longitudinal cuts desired. For example, the blade sets 24 can have three blade sections in the shape of a "Y," five blade sections in the shape of a star, or another arrangement. Also, while the blade sections 26 are shown with a triangular profile, they alternatively can be provided with a curved, rectangular, or other shape profile, or can be provided by wire or another cutting edge. Additionally, a connecting arm 38 extends between each of the blade sets 24, a control arm 40 is connected to one of the blade sets 24 (or to one of the connecting arms 38), and the handle 28 is connected to the control arm 40.

Turning now to the transverse blade assembly 16, it has a series of the transverse blades 30 arranged in a row. The slicer 10 is shown with eight blades 30, but another number and position of blades 30 can be selected based on the number and position of lateral cuts desired in the hot dog. For example, the blades 30 can be angled so the hot dogs are cut diagonally instead of perpendicular to the longitudinal axis. Alternatively, two sets of transverse blades can be provided, with an upper blade set in the housing lid, a lower blade set in the housing base, and a linkage that operates to close the blades sets together to slice the hot dogs transversely. While the blades 26 are shown with a rectangular profile, they alternatively can be provided with a curved, triangular, or other shape profile, or can be provided by wire or another cutting edge. Additionally, a connecting arm 42 extends between each of the blades 30, a control arm 44 is connected to one of the blades 30 (or to one of the connecting arms 42), and the handle 32 connected to the control arm 44.

The connecting arms 38 and 42 and the control arms 40 and 44 can be provided by rods, bars, slats, or the like, and can be made of metal, plastic, or another material. The handles 28 and 32 can be provided by knobs, levers, or other hand gripping devices. Where desired, linkages, gears, or other mechanisms can be operatively coupled between the handles 28 and 32 and the blades 26 and 30 for producing the desired travel of the longitudinal and transverse blades 26 and 30. Alternatively, electric motors (or other actuators) can be operatively coupled to the control arms 40 and 44 and provided with electronic (or other) controls for operating the longitudinal blade assembly 14 and/or the transverse blade assembly 16 to slice the hot dogs. Also, the slicer can be provided with a linkage operatively coupled to the transverse blade assembly and the housing so that, when the housing is closed, the transverse blades are engaged and automatically lowered through the chambers to slice the hot dogs.

Referring now to FIGS. 4-6, the operation of the longitudinal blade assembly 14 is shown in more detail. The housing 12 has a connecting slot 46 defined therein and extending between each of the chambers 18, with the connecting arms 38 movably received in the connecting slots 46. Also, the housing 12 has a longitudinal control slot 48 defined therein, extending through side wall 49, and in communication with one of the chambers 18, with the control arm 40 movably received in the control slot 48. In this configuration, by longitudinally moving the handle 28, the blade sets 24 are longitudinally moved from a first position (shown in solid lines in FIGS. 4 and 5) to a second position (shown in phantom lines), which slices the hot dogs longitudinally into quarters.

It will be noted that each blade set 24 is disposed within one of the chambers 18 with at least one of the blades 26 of that set 24 extending transversely all the way across that chamber 18. In this way, the blades 26 sever the hot dogs into separate pieces, instead of merely making precooking slits a small way into the hot dog as is known in the art. Of course, the blade sets 24 can be provided with only one longitudinal blade extending transversely all the way across that chamber for slicing the hot dog into halves and with other blades for merely cutting slits in the hot dog, if so desired. Also, the outer ends (adjacent the chamber walls) of the blades can slide in grooves in the chamber walls to facilitate smooth operation of the blade assembly 14.

FIGS. 7-11 show various alternative embodiments of the longitudinal blade assembly 14. FIG. 7 shows a longitudinal blade assembly 14*a* having two handles 28*a* attached to two connecting arms 40*a* extending through the housing 12*a*, so that the blade assembly 14*a* can be operated from either side of the housing. FIG. 8 shows a longitudinal blade assembly 14*b* having a longitudinal guide member 29*b* extending from one of the connecting arms 40*b* (or one of the longitudinal blades) and riding in a longitudinal guide slot 13*b* in the housing 12*b*, with the guide member 29*b* oppositely positioned from the handle 28*b*, for providing a smoother sliding operation of the blade assembly 14*b*. FIG. 9 shows a longitudinal blade assembly 14*c* with each blade set 24*c* having only one blade 26*c*, and with the connecting arms 38*c* extending from the backs of the blade sets 24*c*. FIG. 10 shows a longitudinal blade assembly 14*d* having the control arm 40*d* extending from the back of one of the blade sets 24*d* and turned upward so that the handle 28*d* extends through and is operated from the top of the housing. Similarly, FIG. 11 shows a longitudinal blade assembly 14*e* having the control arm 40*e* extending from the back of one of the blade sets 24*e* so that the handle 28*e* extends through and is operated from one of the ends of the housing. It will be understood that the longitudinal control slot, control arm, connecting arms, connecting slots, and handles can be arranged in other ways to accomplish the desired longitudinal slicing.

Referring now to FIGS. 12-14, the operation of the transverse blade assembly 16 is shown in more detail. The housing 12 has a transverse control slot 50 defined therein, extending through end wall 51, and in communication with the guide channels 22, with the connecting arms 42 and the control arm 44 movably received in the control slot 50. Additionally, recessed storage channels 52 are defined in a side wall 53 of the housing 12 and in communication with the guide channels 22, for storing the blades 30 in a first retracted position (shown in solid lines in FIGS. 13 and 14). In this configuration, by transversely moving the handle 32, the blades 30 are guided by the guide channels 22 through the chamber 18 to a second position (shown in phantom lines in FIGS. 13 and 14), which slices the hot dogs transversely into pieces.

It will be noted that the channels 22 extend all the way through the chambers 18 so that the transverse blades 30 can be moved through the channels 22 and all the way across the chambers. In this way, the blades 30 sever the hot dogs into separate transverse pieces, instead of merely making the precooking slits of the prior art. Of course, additional blades can be provided for merely cutting slits in the hot dog, or the blades 30 can be moved only part of the way through the channels, as may be desired.

FIGS. 15-17 show various alternative embodiments of the transverse blade assembly 16. FIG. 15 shows a transverse blade assembly 16*a* having two handles 32*a* attached to two connecting arms 44*a* extending through the housing 12*a*, so that the blade assembly 16*a* can be operated from either side of the housing. FIG. 16 shows a transverse blade assembly 16*b* having a transverse guide member 33*b* extending from one of the connecting arms 44*b* (or one of the transverse blades) and riding in a transverse guide slot 15*b* in the housing 12*b*, with the guide member 33*b* oppositely positioned from the handle 32*b*, for providing a smoother sliding operation of the blade assembly 16b. FIG. 17 shows a transverse blade assembly 16c having the control arm 44c extending therefrom so that the handle 32e extends through the side wall 49c of the housing 12c. It will be understood that the transverse control slot, control arm, connecting arms, guide channels, and handles can be arranged in other ways to accomplish the desired transverse slicing.

Referring now to FIGS. 18-20, there is illustrated a second exemplary embodiment of the present invention, referred to generally as the slicer 110. The slicer 110 has a housing 112 with chambers 118, guide channels 122, and a longitudinal blade assembly (not shown) that are similar to the first exemplary slicer 10. Also, the slicer 110 has a transverse blade assembly 116 with blades 130, connecting arms 142, a control arm 144, and a handle 132. Differently, though, the blades 130 are stored in storage channels 152 in the top wall 153 of the housing 112 when in a retracted first position (shown in solid lines in FIGS. 18 and 20), and two connecting arms 142 slide in two transverse control slots 150. By pushing down on the handle 132, the blades 130 are moved transversely downward through the chambers 118 while being guided by the guide channels from the first position to a second position (shown in phantom lines in FIGS. 18 and 20) with the transverse blades extended all the way through the chambers 118 to slice the hot dogs. Additionally, springs 155 can be attached to the transverse blade assembly 116 and to the housing 112 so that the blades 130 are biased from the second position towards the first retracted position and so that the springs are stretched (see FIG. 18) when the blades 130 are moved downward to slice the hot dogs.

FIGS. 21-22 show various alternative embodiments of the transverse blade assembly 116. FIG. 21 shows a transverse blade assembly 116a having two handles 132a attached to two connecting arms 144a extending through the housing 112a and attached to blade 130a, so that the blade assembly 116a can be operated from either side of the housing. FIG. 22 shows a transverse blade assembly 116b having a transverse guide member 133b extending from one of the connecting arms 144b (or one of the transverse blades 130b) and riding in a transverse guide slot 115b in the housing 112b, with the guide member 133b oppositely positioned from the handle 132b, for providing a smoother sliding operation of the blade assembly 116b. It will be understood that the transverse control slot, control arm, connecting arms, guide channels, and handles can be arranged in other ways to accomplish the desired transverse slicing.

Referring now to FIGS. 23-25, there is illustrated a third exemplary embodiment of the present invention, referred to generally as the slicer 210. The slicer 210 has a housing 212 with chambers 218, connecting slots 246, guide channels (not shown), and a transverse blade assembly (not shown) that are similar to the first exemplary slicer 10. Differently, though, the slicer 210 has a longitudinal blade assembly 214 with a blade set 224 (each having four or another number of blade sections) fixed in each chamber 118 adjacent an opening 259 in an end wall 251 of the housing 212, for slicing the hot dogs lengthwise. Additionally, the slicer 210 includes a paddle assembly having paddle 260 in each chamber 218 and a connecting arm 262 extending between each of the paddles 260 and received through the connecting slots 246. A control arm 264 is connected to one of the paddles 260 (or to one of the connecting arms 262), a handle 266 is connected to the control arm 264, and a longitudinal control slot 268 in the housing 212 and in communication with one of the chambers 218 receives the control arm 264 therethrough. The number of paddles is the same as the number of chambers and transverse blade sets, so different embodiments may have a number of paddles other than the three shown.

In this configuration, by longitudinally moving the handle 266, the paddles 260 are longitudinally moved from a first position (shown in solid lines in FIGS. 23 and 24) to a second position (shown in phantom lines). This forces the hot dogs into contact with the blade sets 224 so that the hot dogs travel longitudinally as the blade sets slice through them, until the hot dogs exit the slicer 220 through the opening 259 now sliced longitudinally into quarters or another number of pieces.

FIGS. 26-28 show various alternative embodiments of the slicer 220 with paddles 260. FIG. 26 shows a handle 266a connected to a control arm 264a extending from the back of the paddles 260a and through an end wall 251a of the housing 212a, for operating the paddles 260a from the end instead of the top of the housing. FIG. 27 shows a handle 266b connected to a control arm 264b extending laterally from one of the paddles 260c and through a side wall 249a of the housing 212a, for operating the paddles 260b from the side instead of the top of the housing. FIG. 28 shows a transverse guide member 233c extending from one of the paddles 260c and riding in a transverse guide slot 215c in the housing 212c, with the guide member 233b oppositely positioned from the handle 266c, for providing a smoother sliding operation of the paddles 260c. It will be understood that the paddles, connecting arms, connecting slots, control arm, control slot, and handle can be arranged in other ways to accomplish the desired longitudinal slicing.

Figure 29:
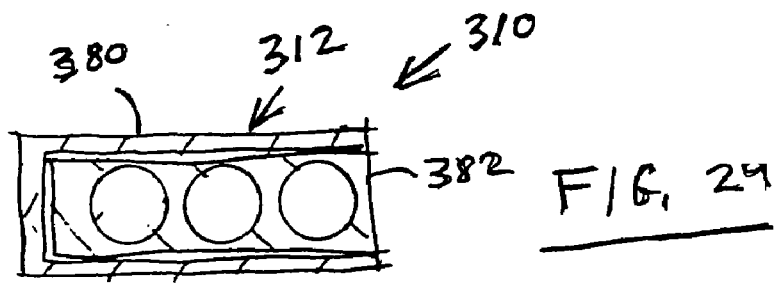
FIG. 29 is a longitudinal section view of a fourth exemplary embodiment of the present invention, showing a hot dog slicer having a housing with a base and an insert tray.
Figure 30:
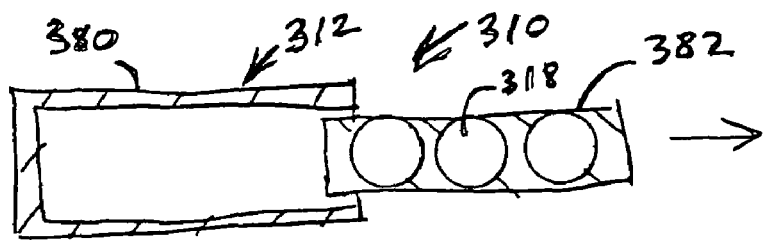
FIG. 30 is a longitudinal section view of the hot dog slicer of FIG. 29, showing the insert tray being removed from the base.

Referring now to FIGS. 29 and 30, there is shown a fourth exemplary embodiment of the present invention, generally referred to as the slicer 310, that is similar to the first exemplary slicer 10. In this embodiment, however, the housing 312 has a base 380 and an insert tray 382 with chambers 318. The insert tray 382 can have a clamshell configuration with interior facing walls that are recessed to cooperatively form the chambers, an open end for sliding the hot dogs into the chamber, or another arrangement. To use the slicer, the hot dogs are inserted into the chambers 318 in the tray 382, the tray is slid into the base 380, and the blade assemblies are operated.

Figure 31:
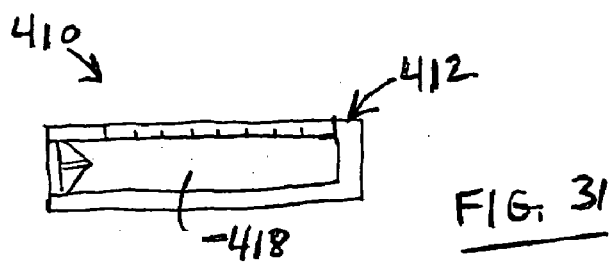
FIG. 31 is a side section view of a fifth exemplary embodiment of the present invention, showing a hot dog slicer having a housing with a single hot dog chamber.
Figure 32:
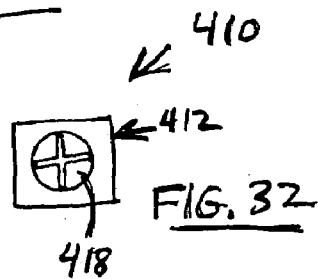
FIG. 32 is a longitudinal section view of the hot dog slicer of FIG. 31.

Referring now to FIGS. 31 and 32, there is shown a fifth exemplary embodiment of the present invention, generally referred to as the slicer 410, that is similar to the first exemplary slicer 10. In this embodiment, however, the housing 412 has only a single chamber 418, as may be desired for home use.

Figure 33:
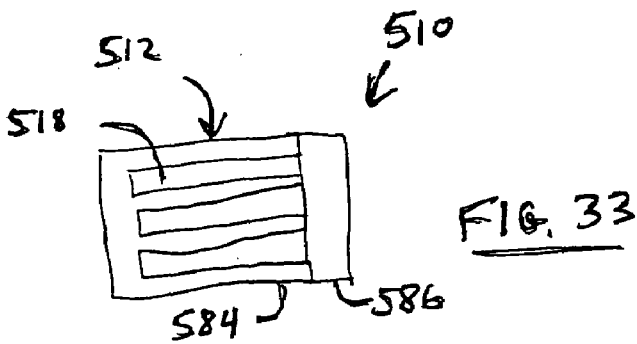
FIG. 33 is a top section view of a sixth exemplary embodiment of the present invention, showing a hot dog slicer having a housing with a base and an end lid.
Figure 34:
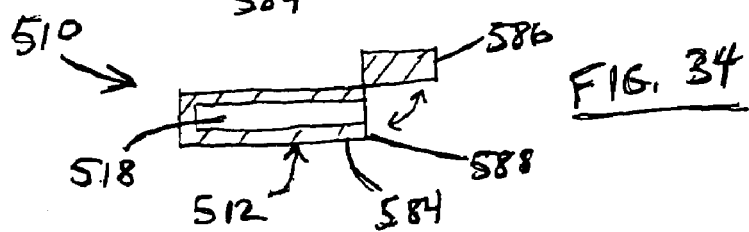
FIG. 34 is a side section view of the hot dog slicer of FIG. 33, showing the lid swung open so that a hot dog can be inserted into the base.
Figure 35:
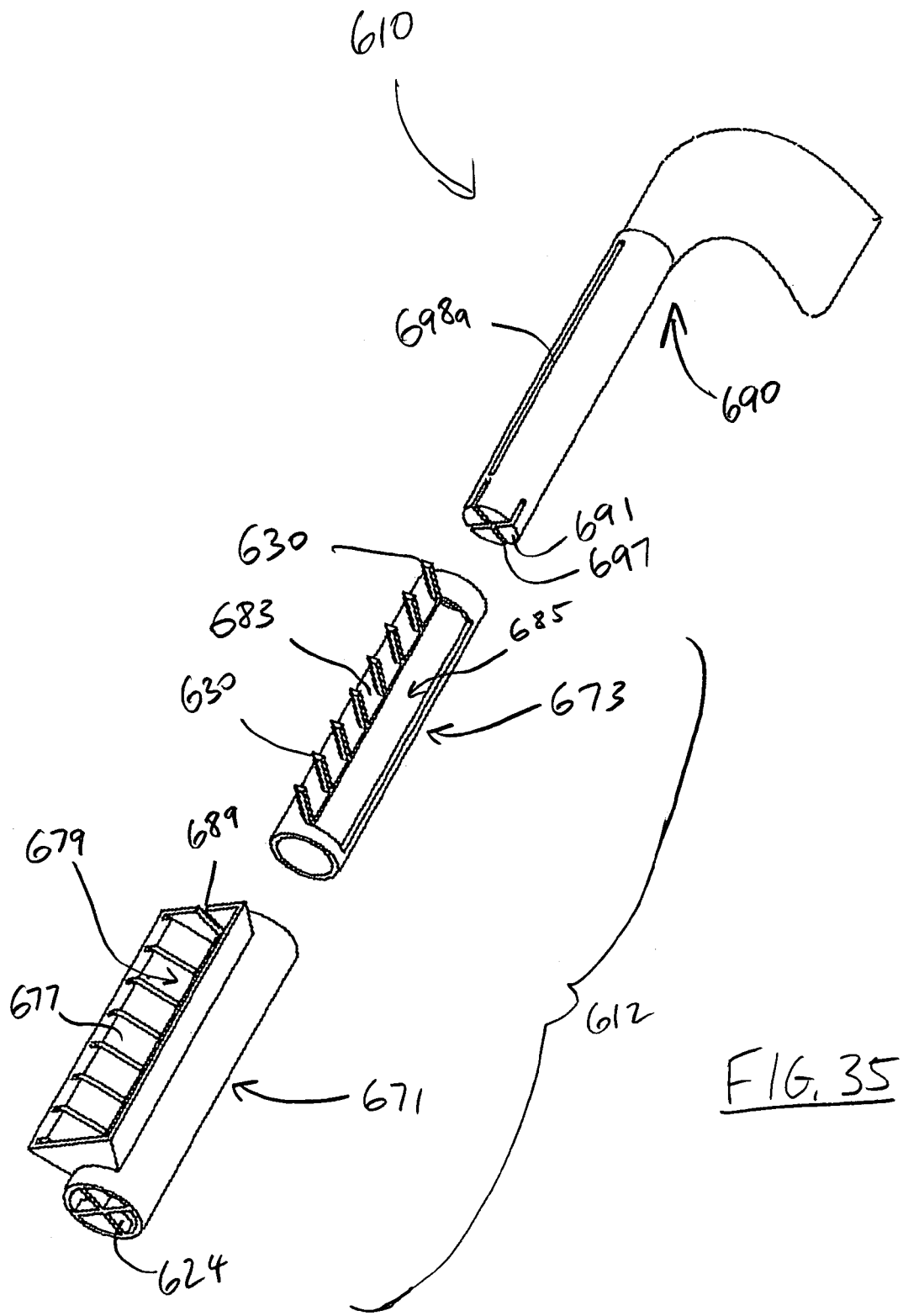
FIG. 35 is an exploded perspective view of a seventh exemplary embodiment of the present invention, showing a two-part housing and a plunger.
Figure 36:
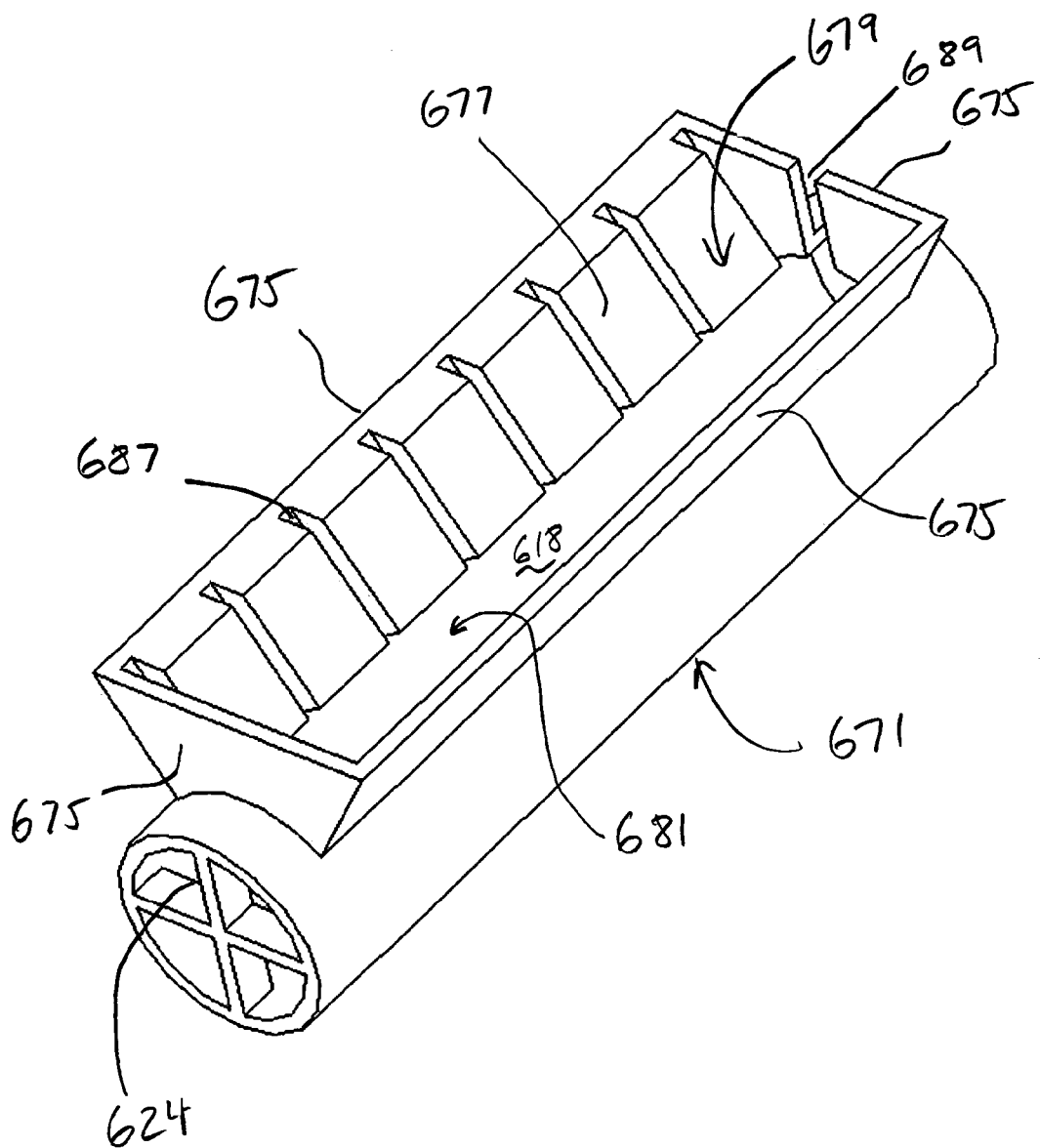
FIG. 36 is a perspective view of the first part of the housing of the hot dog slicer of FIG. 35, showing a chamber with a longitudinal blade assembly and a hopper with a retainer wall and a first opening.
Figure 37:
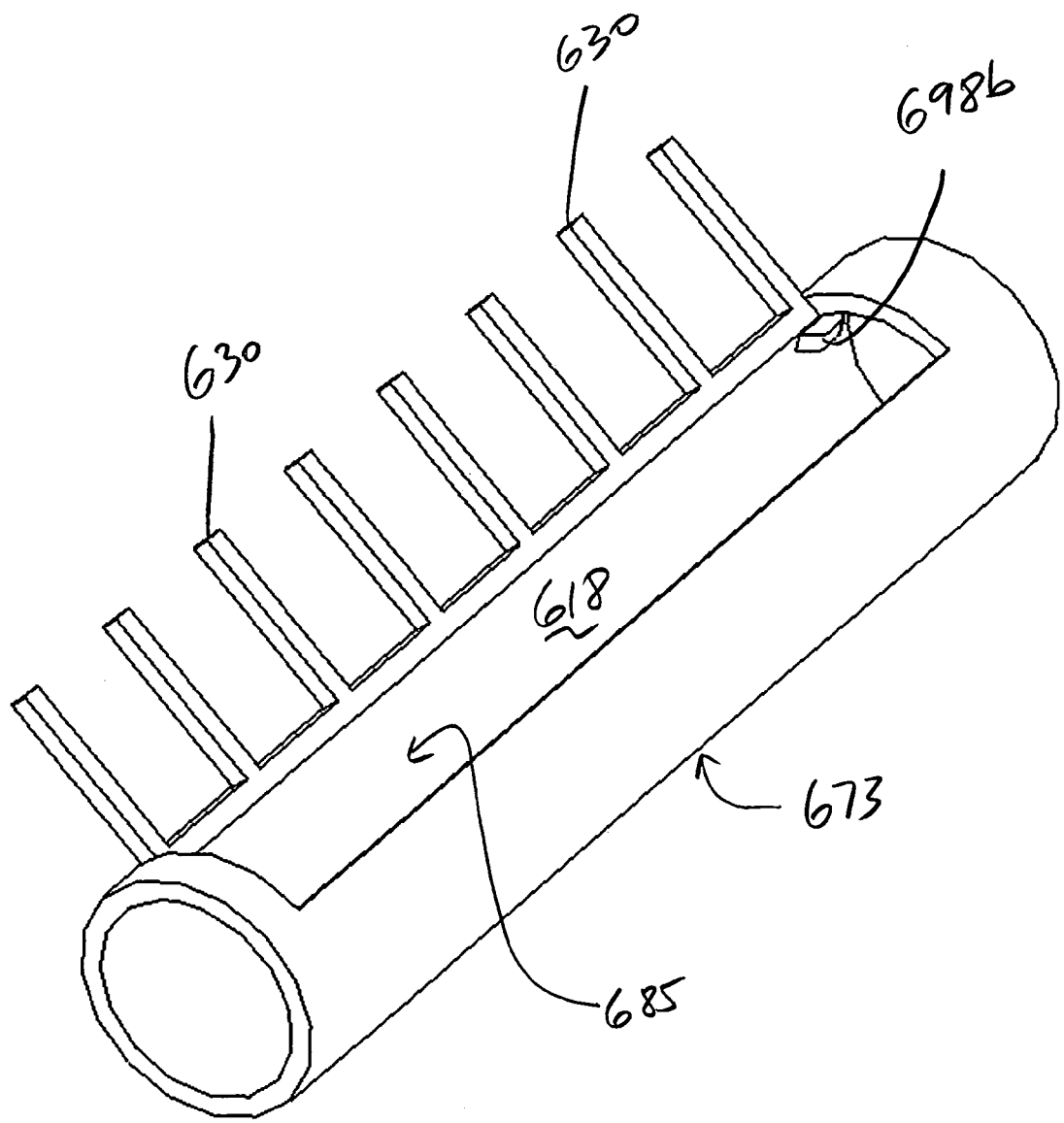
FIG. 37 is a perspective view of the second part of the housing of the hot dog slicer of FIG. 35, showing a series of transverse blades and a second opening.
Figure 38:
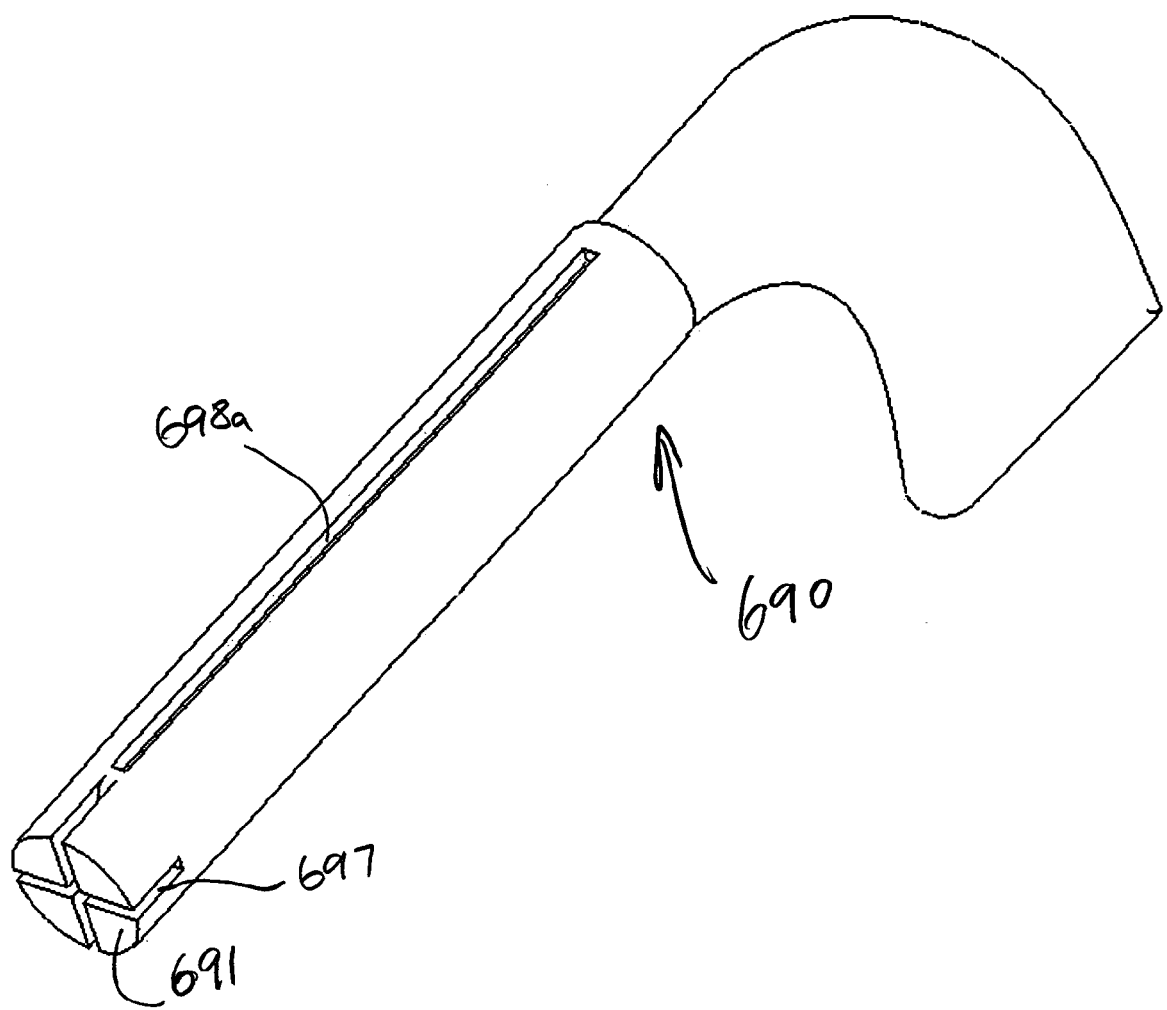
FIG. 38 is a perspective view of the plunger of the hot dog slicer of FIG. 35.

Referring now to FIGS. 33 and 34, there is shown a sixth exemplary embodiment of the present invention, generally referred to as the slicer 510, that is similar to the first exemplary slicer 10. In this embodiment, however, the housing 512 has a base 584 and a lid 586 hingedly coupled to and end of the base (instead of to the top of the base of the slicer 10). The base 584 has chambers 518 formed therein that extend through an end wall 588 of the base 584 so that the lid 586 covers the chambers when closed and exposes them when open. In this embodiment, to slice hots dogs, the lid 586 is swung open, the hot dogs are slid into the chambers 518, the lid 586 is swung closed, and the blade assemblies are operated.

Referring now to FIGS. 35-41, there is shown a seventh exemplary embodiment of the present invention, generally referred to as the slicer 610. The slicer 610 is similar to the previously described embodiments in that the slicer includes a housing 612 with an elongate chamber 618 for a hot dog, a series of transverse blades 630 for slicing the hot dog laterally into a number of disc sections, and at least one longitudinal blade 624 for slicing the hot dog lengthwise into at least two pieces, for example into quarters.

The slicer 610 as depicted includes only one chamber 618 sized and shaped for holding one hot dog. In alternative embodiments, the housing includes multiple chambers and/or an oversized chamber for holding multiple hot dogs (e.g., in an end-to-end or side-by-side arrangement), and/or is sized and shaped for holding other elongate food products. The various components of the slicer 610 may be molded of plastic for high volume, low cost, efficient manufacture and snap-fit assembly, though other materials and manufacturing techniques may be suitably employed.

The housing 612 includes two elements 671 and 673 that rotate or otherwise move relative to each other to make the transverse slices. Details of these two elements 671 and 673 of the depicted embodiment will now be described. The first element 671 is generally cylindrical and the second element 673 is generally cylindrical and telescopically received in the first element. The first element 671 has outwardly extending walls 675 including a retainer surface 677 that define a hopper 679 for the hot dog. And the second element 673 includes the transverse blades 630, which extend into the hopper 679 and can be rotated from a ready position to a sliced position. In the ready position, the hot dog is positioned between the retainer surface 677 and the transverse blades 630, and in the sliced position the transverse blades 630 have been rotated to transversely slice the hot dog all the way through into a number of transverse disc-shaped pieces. The number of transverse pieces depends on the number of transverse blades 630. While seven transverse blades 630 are included in this embodiment, more or less may be used. Additional details of the structures for rotating the two elements 671 and 673 relative to each other are described with respect to the longitudinal plunger.

Figure 39:
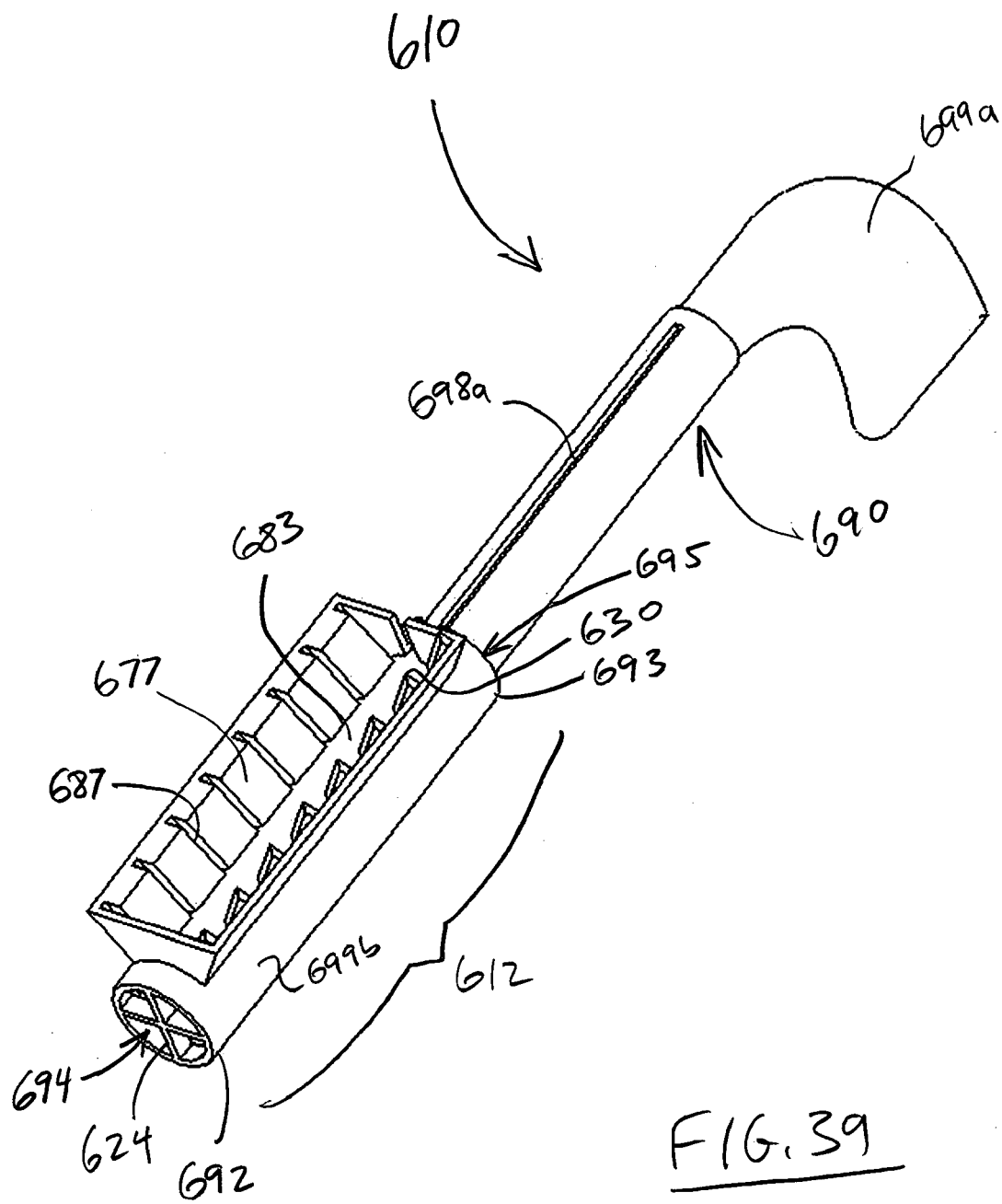
FIG. 39 is a perspective view of the hot dog slicer of FIG. 35, showing the transverse blades and the longitudinal blade in ready positions.
Figure 40:
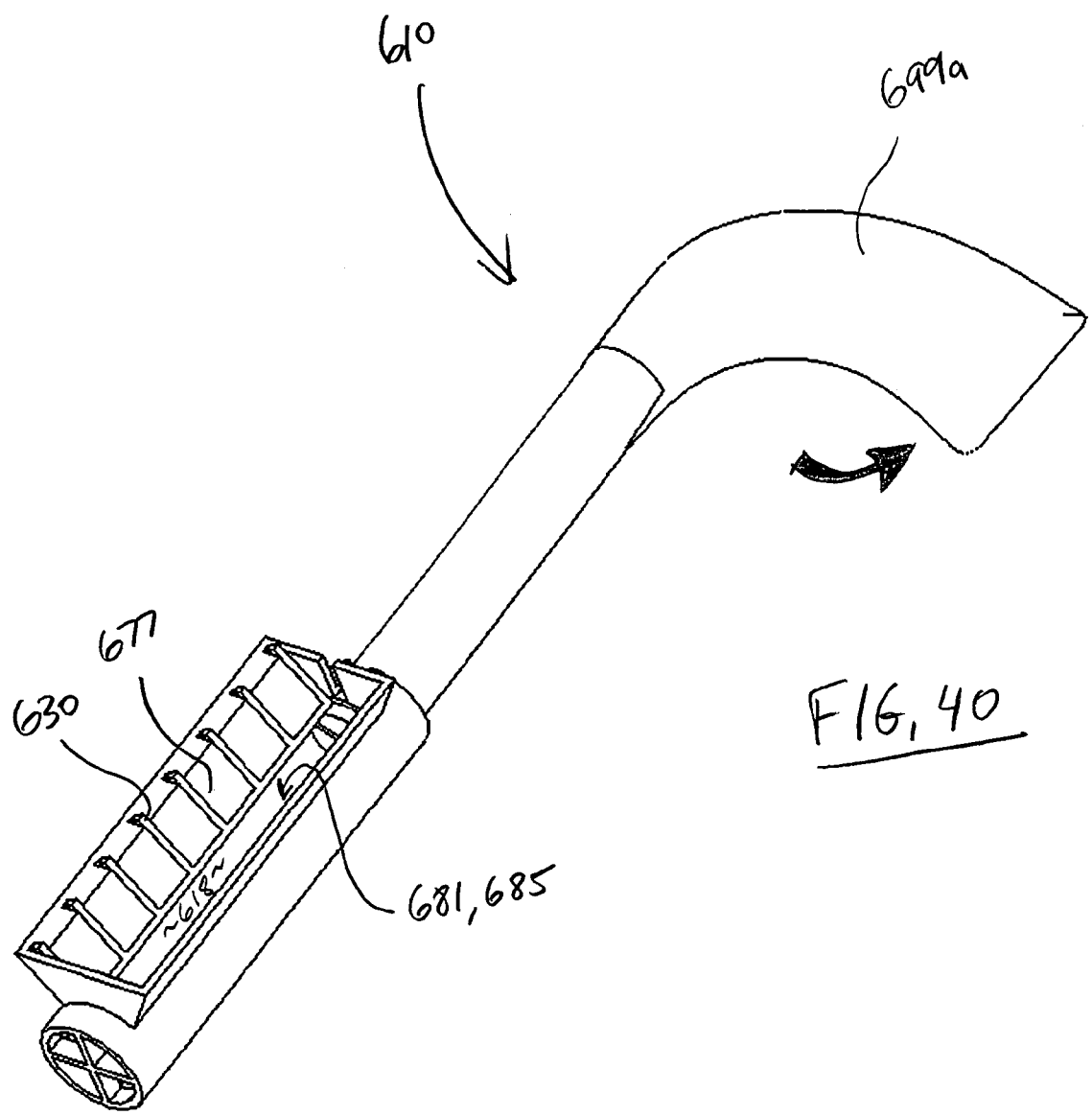
FIG. 40 is a perspective view of the hot dog slicer of FIG. 39, showing the transverse blades moved to a sliced position.

In addition, the first element 671 has a first opening 681 through which the hot dog can pass from the hopper 679 to the chamber 618. And the second element 673 has a blocking section 683 and a second opening 685 with the transverse blades 630 positioned between them. As shown in FIG. 39, when the transverse blades 630 are in the ready position, the blocking section 683 prevents the hot dog from passing into the chamber 618. As shown in FIG. 40, when the transverse blades 630 are rotated to the sliced position, the first opening 681 and the second opening 685 are aligned to permit the hot dog to pass through them into the chamber 618.

Furthermore, the retainer surface 677 preferably has a series of channels 687 configured to receive the transverse blades 630 in the sliced position. In this way, the transverse blades 630 are assured of passing all the way through the hot dog to make sure that the hot dog is sliced completely through by the transverse blades into the transverse pieces. In addition, the transverse blades 630 preferably extend radially from the second element 673, and the hopper retainer surface 677 and the oppositely facing one of the hopper walls 675 preferably extend radially from the first element 671, so that the transverse blades seat against these two surfaces in the ready and sliced positions. Moreover, an access slot 689 is preferably formed in the first element 671, with at least a portion of the access slot in one of the hopper walls 675. The transverse blades 630 can pass through the access slot 689 to longitudinally move and separate the first element from the second element 673 for cleaning them both.

In alternative embodiments, only one of the first or second elements is cylindrical with a circumferential wall, and the other one does not have a circumferential wall. In one such embodiment, the second element has two spaced apart bands with the curved blocking section extending between them, the second opening spanning the remainder of the circumferential area between the bands, and the transverse blades extending from an edge of the blocking section. In another such embodiment, the second element has just the curved blocking section with the transverse blades extending from it, and the blocking section is slidably coupled to the first element by a guide track or the like.

In other alternative embodiments, the hopper also has a series of channels in the hopper wall facing the hopper retainer surface, with the channels configured to receive the transverse blades in the ready position. In this way, the leading edges of the transverse blades are recessed into the hopper wall and not exposed when the user places a hot dog into the hopper for slicing. Alternatively, the channels may be defined by a series of ridges extending from hopper walls.

In still other alternative embodiments, the hot dog is held in the chamber of the first element for the transverse slicing (instead of in a separate hopper), and the transverse blades of the second element are moved through guide channels in the first element and into the chamber to transversely slice the hot dog. In addition, the retainer surface is defined by an inner wall surface of the chamber that is opposite the transverse blades in the ready position, with the hot dog between the retainer surface and the transverse blades. In one such embodiment, the transverse blades are generally circular, and the first and second elements are pivotally coupled together so that the transverse blades pivot into the guide channels to transversely slice the hot dog. In another such embodiment, the transverse blades are generally circular, and the first and second elements are laterally and slidingly coupled together so that the transverse blades slide sideways into the guide channels to transversely slice the hot dog. And in still another such embodiment, the transverse blades are similar to those of the depicted embodiment, the first element includes a wedge-shaped outer housing, and the first and second elements are pivotally coupled together so that the transverse blades pivot within the wedge-shaped outer housing, through the guide channels, and through the chamber to transversely slice the hot dog.

Having described the transverse slicing, details of the longitudinal slicing will now be described. The slicer includes a longitudinal plunger 690, and along with the longitudinal blade 624 in the housing chamber 618, these components are structurally and functionally similar to the paddle, longitudinal blade, and chamber arrangement of the third exemplary embodiment. The plunger 690 is received in the chamber 618 and is longitudinally moveable in the chamber from a ready position to a sliced position. In the ready position, the hot dog is positioned between a contact face 691 of the plunger 690 and the longitudinal blade 624. In the sliced position, the plunger 690 and the longitudinal blade 624 have been longitudinally moved relative to each other to longitudinally slice the hot dog all the way through into at least two longitudinal pieces, the number of pieces dependent on the configuration of the longitudinal blade.

The housing 612 includes a first end portion 692 and a second end portion 693, the first end portion has a first opening 694, the longitudinal blade 624 is positioned at the first opening, and the second end portion has an opening 695 through which the plunger 690 is received. Longitudinally moving the plunger 690 relative to the housing 612 from the ready to the sliced position pushes the hot dog into engagement with and past the longitudinal blade 624 and out of the housing through the first opening 694 in a longitudinally sliced condition. Preferably, the plunger contact surface 691 has at least one channel 697 that is configured to receive the longitudinal blade 624 when the plunger 690 is in the sliced position. This makes sure that the hot dog is sliced completely through by the longitudinal blade 624 into the longitudinal pieces and is also pushed out of the housing 612 through the housing opening 694.

In the depicted embodiment, the longitudinal blade 624 is mounted to the first element 671. In an alternative embodiment, the longitudinal blade 624 is mounted instead to the second element 673. Preferably, the longitudinal blade 624 is "X" shaped for longitudinally slicing the hot dog into quarters, though other blade arrangements can be used for slicing the hot dog into another more or less pieces.

Having described the plunger 690 and the first and second elements 671 and 673 of the housing 612, details of the interrelationship of these two components will now be described. The housing 612 and the plunger 690 have cooperating engagement elements that prevent rotation between the plunger and either the first element 671 or the second element 673 of the housing. For example, the cooperating engagement elements may be provided by a slot 698a (see FIG. 37) and a tab 698b extending into the slot (collectively referred to as "the engagement elements 698"). In the depicted embodiment, the slot 698a is formed into the plunger 690 and the tab 698b extends inwardly from the second element 673 of the housing 612. With the tab 698b engaged in the slot 698a, rotating the plunger 690 also rotates the second element 673 (which include the transverse blades 630), but does not positively rotate the first element 671 (which includes the retainer surface 677). In addition, the engagement elements 698 guide and limit the longitudinal movement of the plunger 690 from the ready position to the sliced position. For example, in the depicted embodiment the slot 698a is elongated to permit the length of travel needed to slice completely through the hot dog longitudinally.

In an alternative embodiment, separate sets of cooperating engagement elements are provided for these two functions. And in another alternative embodiment, the same or another set of cooperating engagement elements are arranged to permit the longitudinal movement only when the transverse blades have been returned to the ready position so that the blocking section prevents the hot dog from deflecting through the aligned openings of the first and second housing elements. Preferably, the elongated slot is generally linear, as shown. But alternatively it can have a curved, spiral, or other configuration for guiding the longitudinal movement to produce non-linear longitudinal slices.

To use the slicer 610, a user inserts a hot dog into the hopper with the transverse blades 630 and the longitudinal blade 624 in their ready positions, as shown in FIG. 39. In the ready position, the blocking section 683 prevents the hot dog from falling from the hopper 679 into the chamber 618. Then the user grasps a gripping portion 699a of the plunger 690 with one hand, and grasps a gripping portion 699b of housing 612 with the other hand, and rotates the grips (collectively, the "grips 699") relative to each other, as indicated by the directional arrow in FIG. 39. This rotates the transverse blades 630 relative to the retainer surface 677, from the ready position to the sliced position shown in FIG. 40, to transversely slice the hot dog into a number of disc-like pieces.

In the sliced position, the blocking section 683 has been rotated from its blocking position, and now the first and second openings 681 and 685 are aligned. This allows the transversely sliced hot dog to fall through the aligned openings 681 and 685 and pass from the hopper 679 into the chamber 618 for the longitudinal slicing.

The user then rotates the grips 699 in the reverse direction to return the transverse blades 630 back to the ready position of FIG. 39. In this position, the blocking section 683 is returned to its blocking position so that it retains the transversely sliced hot dog in the chamber 618 during the longitudinal slicing.

Figure 41:
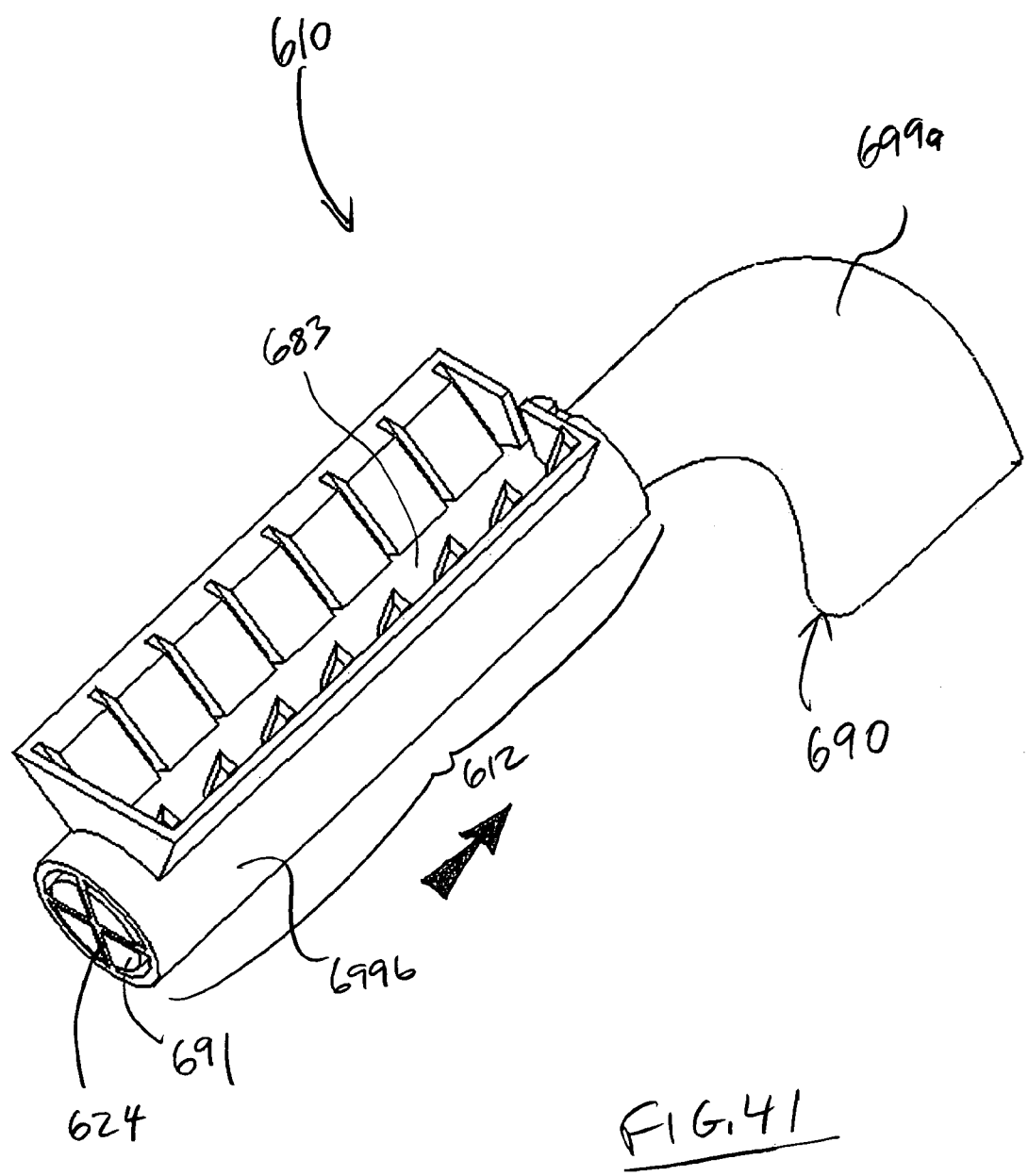
FIG. 41 is a perspective view of the hot dog slicer of FIG. 39, showing the longitudinal blade moved to a sliced position after the transverse blades have been moved back to the ready position.

The user next longitudinally moves the grips 699 relative to each other, as indicated by the directional arrow in FIG. 41, which longitudinally moves the longitudinal blade 624 relative to the plunger contact surface 691 from the ready position to the sliced position. By doing so, the plunger contact surface 691 pushes the hot dog into contact with the longitudinal blade 624, past the longitudinal blade 624 to longitudinally slice the hot dog all the way through into quarters, and out of the first open end 694 of the housing 618. The user now has a hot dog that has been sliced both transversely and longitudinally into a number of pieces, all of which are small enough to be easily swallowed by a child without the danger of choking.

Although there are two motions, a rotation/twist and a longitudinal push, they are performed in one smooth action. The user can make these two motions sequentially, without any intervening action. In this way, hot dog slicing can be accomplished quickly and easily without having to change grip positions or perform multiple actions.

In an alternative method of use, the slicer can be used to produce longitudinally sliced hot dog strips, without the transverse cuts. This method is the same as that described above, except that the hotdog is placed into the chamber with the transverse blades already rotated so that the transverse slicing is bypassed. In another alternative method of use, the slicer can be used to produce transversely sliced hot dog disks, without the longitudinal cuts. This method is the same as that described above, except that the hot dog is transversely sliced and then removed from the hopper, without making the additional longitudinal cuts. Furthermore, in an alternative embodiment of the invention, the slicer has only the longitudinal blades or only the transverse blades, so that it can only make the longitudinal cuts or the transverse cuts. These alternative embodiments and methods of use may be acceptable for slicing hot dogs for older children with larger diameter throats, and are contemplated by and intended to be within the scope of the present invention.

In view of the foregoing, it will be appreciated that present invention provides a hot dog slicer for slicing hot dogs lengthwise, preferably into quarters, and also slicing dogs laterally into disc sections so that the resulting pieces are small enough that children do not choke on them. In some embodiments the slicer is designed to slice one or a number of hot dogs simultaneously, while in other embodiments the slicer has a simpler and lower cost design for slicing only one hot dog at a time. Additionally, the various embodiments of the slicer are inexpensive to manufacture and safe and easy to use.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been described with reference to example embodiments, it will be understood by those skilled in the art that a variety of modifications, additions and deletions are within the scope of the invention, as defined by the following claims.

The invention claimed is:

1. A slicer for a food product, comprising:
a housing having at least one longitudinal blade and defining a chamber that receives the food product;
the housing including a first element having a retainer surface and a second element having a series of transverse blades, wherein the first and second elements are rotatable relative to each other from a ready position with the food product positioned between the retainer surface and the transverse blades to a sliced position to transversely slice the food product all the way through into a plurality of transverse pieces; and
a plunger that is received in the housing and moveable relative to the longitudinal blade from a ready position with the food product positioned therebetween to a sliced position to longitudinally slice the food product all the way through into at least two longitudinal pieces, wherein the second element and the plunger have cooperating engagement elements that prevent rotation therebetween, wherein rotating the plunger rotates the transverse blades relative to the longitudinal blades.

2. The slicer of claim 1, wherein the housing includes a first end portion and a second end portion, the first end portion defines a first opening, the longitudinal blade is positioned at the first opening, and the second end portion defines an opening through which the plunger is received and longitudinally moved to the sliced position to push the food product into engagement with the longitudinal blade and out of the housing through the first opening to longitudinally slice the food product.

3. The slicer of claim 1, wherein the plunger has a contact surface defining at least one channel configured to receive the longitudinal blade when the plunger is in the sliced position to ensure that the food product is sliced completely through by the longitudinal blade into the longitudinal pieces.

4. The slicer of claim 1, wherein the housing and the plunger have cooperating engagement elements that guide and limit the longitudinal movement of the plunger from the ready position to the sliced position.

5. The slicer of claim 4, wherein the cooperating engagement elements include a slot defined in the plunger and a tab extending from the housing and into the slot.

6. The slicer of claim 1, wherein the cooperating engagement elements permit longitudinal movement of the plunger relative to the first and second elements of the housing.

7. A slicer for a food product, comprising;
a housing defining a hopper that receives the food product for transverse slicing, defining a chamber that receives the food product for longitudinal slicing, and having at least one longitudinal blade;
the housing including a first element having a retainer surface and a second element having a series of transverse blade, wherein the first and second elements are movable relative to each other from a ready position with the food product positioned between the retainer surface and the transverse blades to a sliced position to transversely slice the food product all the way through into a plurality of transverse pieces, wherein the retainer surface extend from the first element and at least partially defines the hopper, and the transverse blade extend from the second element and into the hopper; and
a plunger that is received in the housing and movebale relative to the longitudinal blade from a ready position with the food product positioned therebetween to a sliced position to longitudinally slice the food product all the way through into at least two longitudinal pieces.

8. The slicer of claim 7, wherein the retainer surface defines a series of channels configured to receive the transverse blades in the sliced position to ensure that the food product is sliced completely through by the transverse blades into the transverse pieces.

9. The slicer of claim 7, wherein the hopper defines an access slot through which the transverse blades may pass to longitudinally move and separate the first element from the second element.

10. The slicer of claim 7, wherein the housing includes a first end portion and a second end portion, the first end portion defines a first end opening, the longitudinal blade is positioned at the first end opening, and the second end portion defines a second end opening through which the plunger is received and longitudinally moved to the sliced position to push the food product into engagement with the longitudinal blade and out of the housing through the first end opening to longitudinally slice the food product.

11. The slicer of claim 7, wherein the first element defines a pass-through opening through which the food product can pass from the hopper to the chamber, and the second element defines a blocking section, wherein when the transverse blades are in the ready position, the blocking section prevents the food product from passing into the chamber.

12. A slicer for a food product, comprising:
a housing defining a hopper that receives the food product for transverse slicing, defending a chamber that receives the food product for longitudinal slicing, and having at least one longitudinal blade;
the housing including a first element having a retainer surface and a second element having a series of transverse blade, wherein the first and second elements are movable relative to each other from a ready position with the food product position between the retainer surface and the blades to a sliced position to transversely slice the food product all the way thought into a plurality of transverse pieces; and
a plunger that is received in the housing and moveable relative to the longitudinal blade from a ready position with the food product positioned therebetween to a sliced position to longitudinally slice the food product all the way through into at least two longitudinal pieces, wherein the first element defines a first opening through which the food product can pass from the hopper to the chamber, and the second element defines a blocking section, wherein when the transverse blades are in the ready position, the blocking section prevents the food product from passing into the chamber.

13. The slicer of claim 12, wherein the second element defines a second opening, wherein when the transverse blades are in the sliced position, the first opening and the second opening are aligned to permit the food product to pass therethrough into the chamber.

14. The slicer of claim 13, wherein the transverse blades are positioned between the blocking section and the second opening.

15. The slicer of claim 12, wherein the housing includes a first end portion and a second end portion, the first end portion defines a first end opening, the longitudinal blade is positioned at the first end opening, and the second end portion defines a second end opening through which the plunger is received and longitudinally moved to the sliced position to push the food product into engagement with the longitudinal blade and out of the housing through the first end opening to longitudinally slice the food product.

16. A slicer for a hot dog, comprising:
a housing having at least one longitudinal blade and defining a chamber that receives the hot dog;
the housing comprising a first element and a second element that are rotatable relative to each other, the first element having a hopper at least partially defined by a retainer surface, the second element having a series of transverse blades extending into the hopper and moveable from a ready position with the hot dog positioned between the retainer surface and the transverse blades to a sliced position to transversely slice the hot dog all the way through into a plurality of transverse pieces; and
a plunger that is received in and is longitudinally moveable in the chamber from a ready position with the hot dog positioned between the plunger and the longitudinal blade to a sliced position to longitudinally slice the hot dog all the way through into at least two longitudinal pieces.

17. The slicer of claim 16, wherein the first element defines a first opening through which the hot dog can pass from the hopper to the chamber, and the second element has a blocking section and a second opening with the transverse blades positioned therebetween, wherein when the transverse blades are in the ready position, the blocking section prevents the hot dog from passing into the chamber, and wherein when the transverse blades are in the sliced position, the first opening and the second opening are aligned to permit the hot dog to pass therethrough into the chamber.

18. The slicer of claim 16, wherein the second element rotates relative to the first element to rotate the transverse blades to transversely slice the food product, and the housing and the plunger have cooperating engagement elements that prevent rotation between the plunger and the first or second element so that rotating the plunger rotates the transverse blades relative to the retainer surface, and the cooperating engagement elements permit the longitudinal movement of the plunger relative to the first and second elements of the housing.

19. The slicer of claim 16, wherein the first element is generally cylindrical and the second element is generally cylindrical and telescopically received in the first element.

20. The slicer of claim 16, wherein the plunger has a gripping portion and the housing first element has a gripping portion, wherein the slicer is operable to sequentially transversely slice the hot dog and then longitudinally slice the hot dog by rotating, in a first direction, the plunger gripping portion relative to the housing gripping portion to move the transverse blades from the ready position to the sliced position, then rotating, in a second reverse direction, the plunger gripping portion relative to the housing gripping portion to move the transverse blades from the sliced position back to the ready position, and then longitudinally moving the plunger gripping portion relative to the housing gripping portion to move the longitudinal blade from the ready position to the sliced position.

* * * * *